(12) United States Patent
Horie et al.

(10) Patent No.: US 8,210,146 B2
(45) Date of Patent: Jul. 3, 2012

(54) INTAKE PATH GAS INTRODUCING DEVICE AND INTERNAL COMBUSTION ENGINE

(75) Inventors: Nobuhiko Horie, Toyota (JP); Akira Nakawatase, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 638 days.

(21) Appl. No.: 12/472,876

(22) Filed: May 27, 2009

(65) Prior Publication Data

US 2009/0293829 A1    Dec. 3, 2009

(30) Foreign Application Priority Data

May 27, 2008  (JP) ................................ 2008-138263

(51) Int. Cl.
*F02M 35/10* (2006.01)
*F02B 75/22* (2006.01)
(52) U.S. Cl. .............. 123/184.31; 123/54.4; 123/184.36
(58) Field of Classification Search ........ 123/54.4–54.8, 123/184.31–184.37
See application file for complete search history.

(56) References Cited

FOREIGN PATENT DOCUMENTS

| JP | 60090973 A | 5/1985 |
|---|---|---|
| JP | 63-71420 U | 5/1988 |
| JP | 6050216 | 2/1994 |
| JP | 6081721 | 3/1994 |
| JP | 07-103092 A | 4/1995 |
| JP | 7259657 | 10/1995 |
| JP | 10122071 | 5/1998 |
| JP | 2003035213 A | 2/2003 |
| JP | 2004245114 A | 9/2004 |
| JP | 2006096200 A | 4/2006 |
| JP | 2006283601 A | 10/2006 |

OTHER PUBLICATIONS

Japanese Office Action issued Dec. 13, 2011 from JP 2010-133811 with partial English translation.

*Primary Examiner* — Noah Kamen
(74) *Attorney, Agent, or Firm* — Gifford, Krass, Sprinkle, Anderson & Citkowski, P.C.

(57) ABSTRACT

A strong structural body is formed by integrating a side wall portion in the form of inverted V and a plate-shaped bottom wall portion. Plate-shaped side wall portions of the side wall portion in the form of inverted V are integrated with respective manifold arrays, whereby the two manifold arrays are linearly connected by the plate-shaped bottom wall portion.

22 Claims, 20 Drawing Sheets

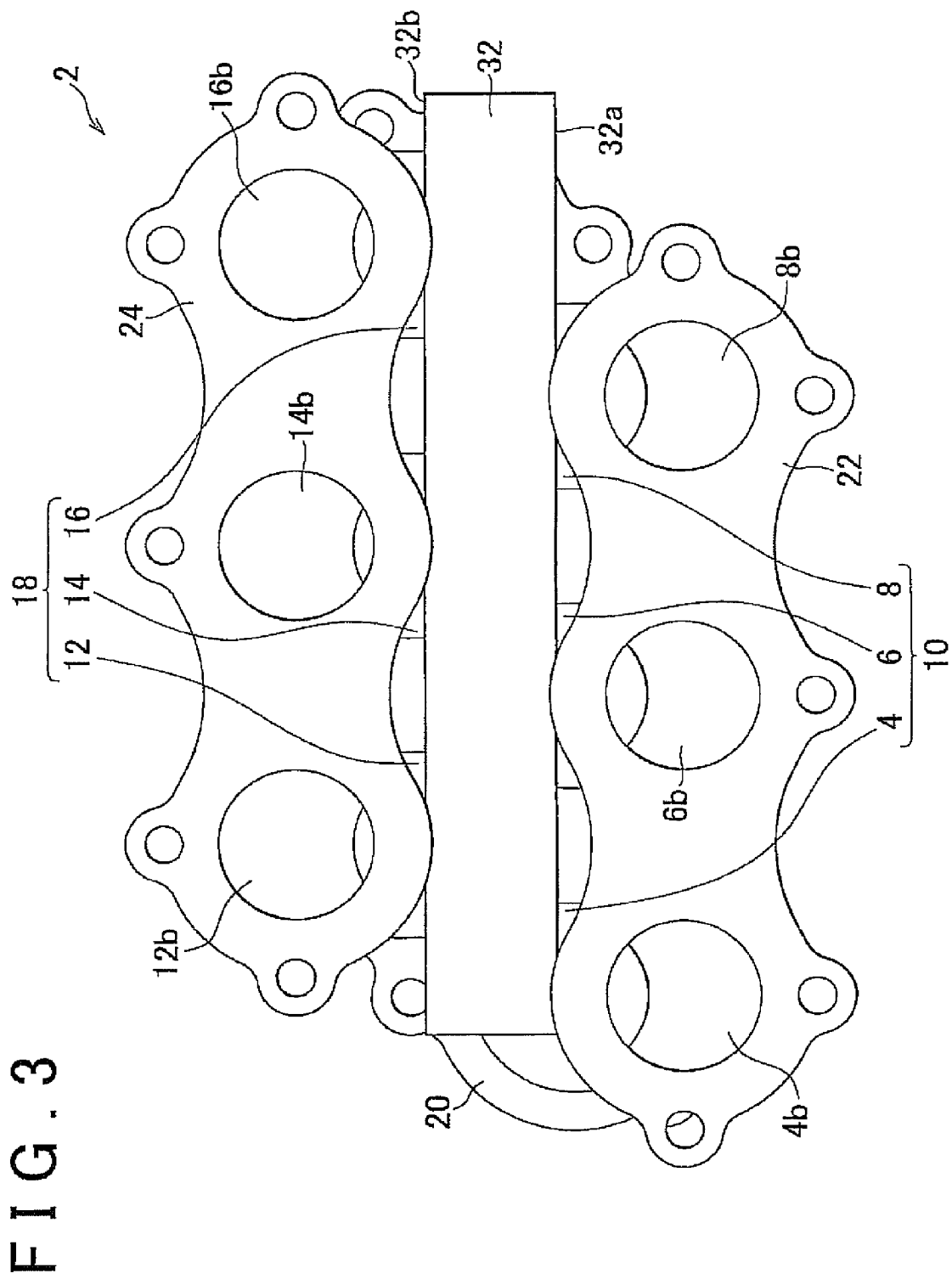

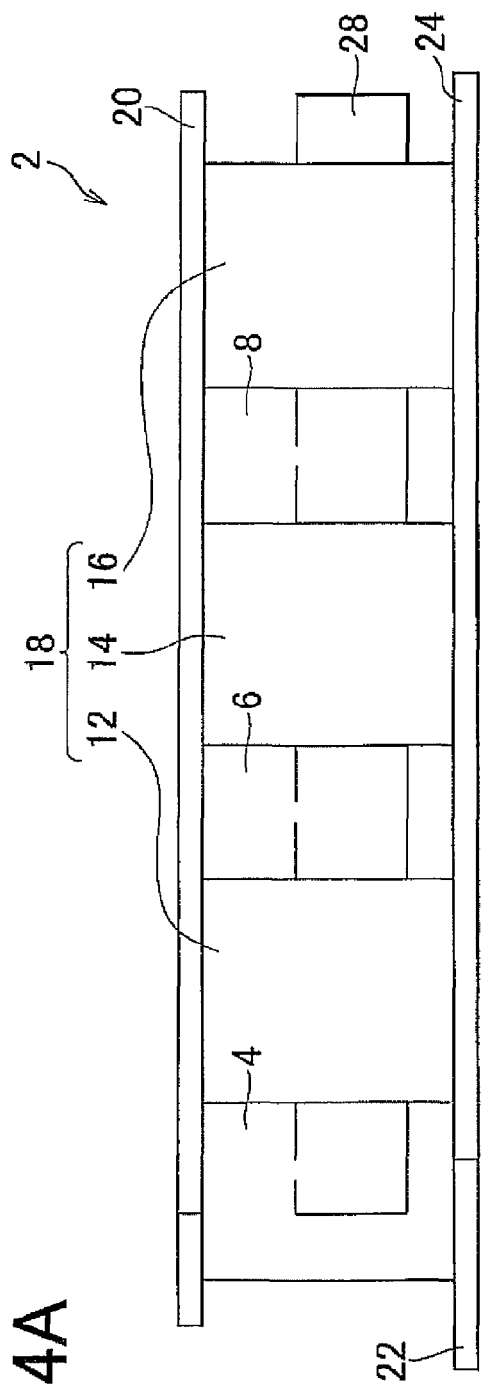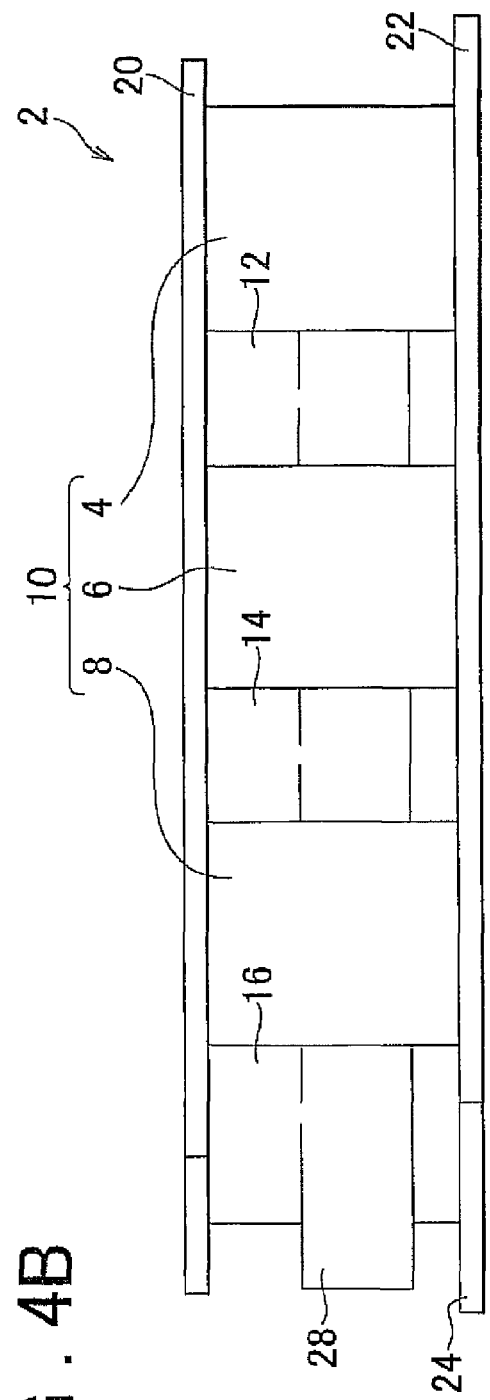

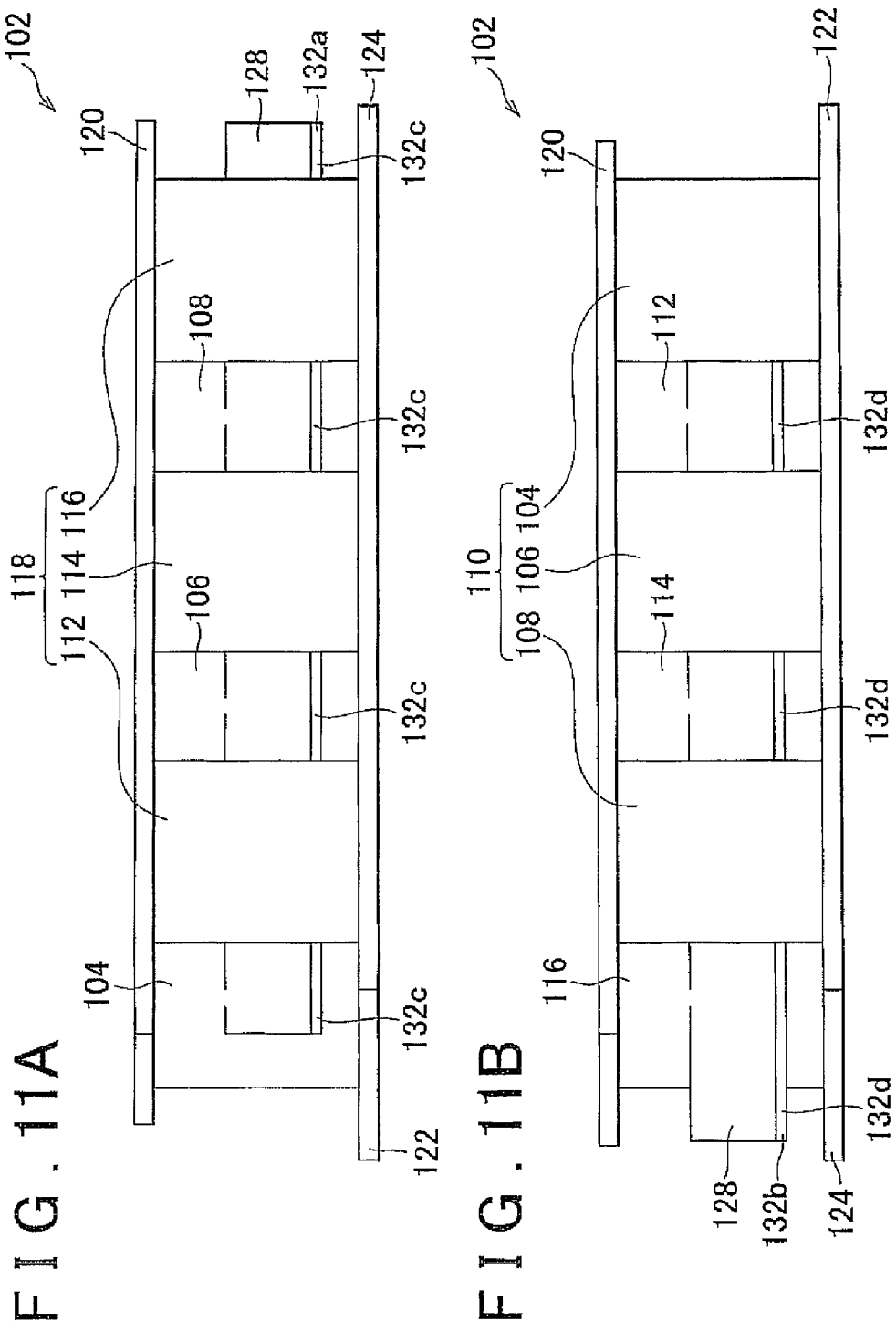

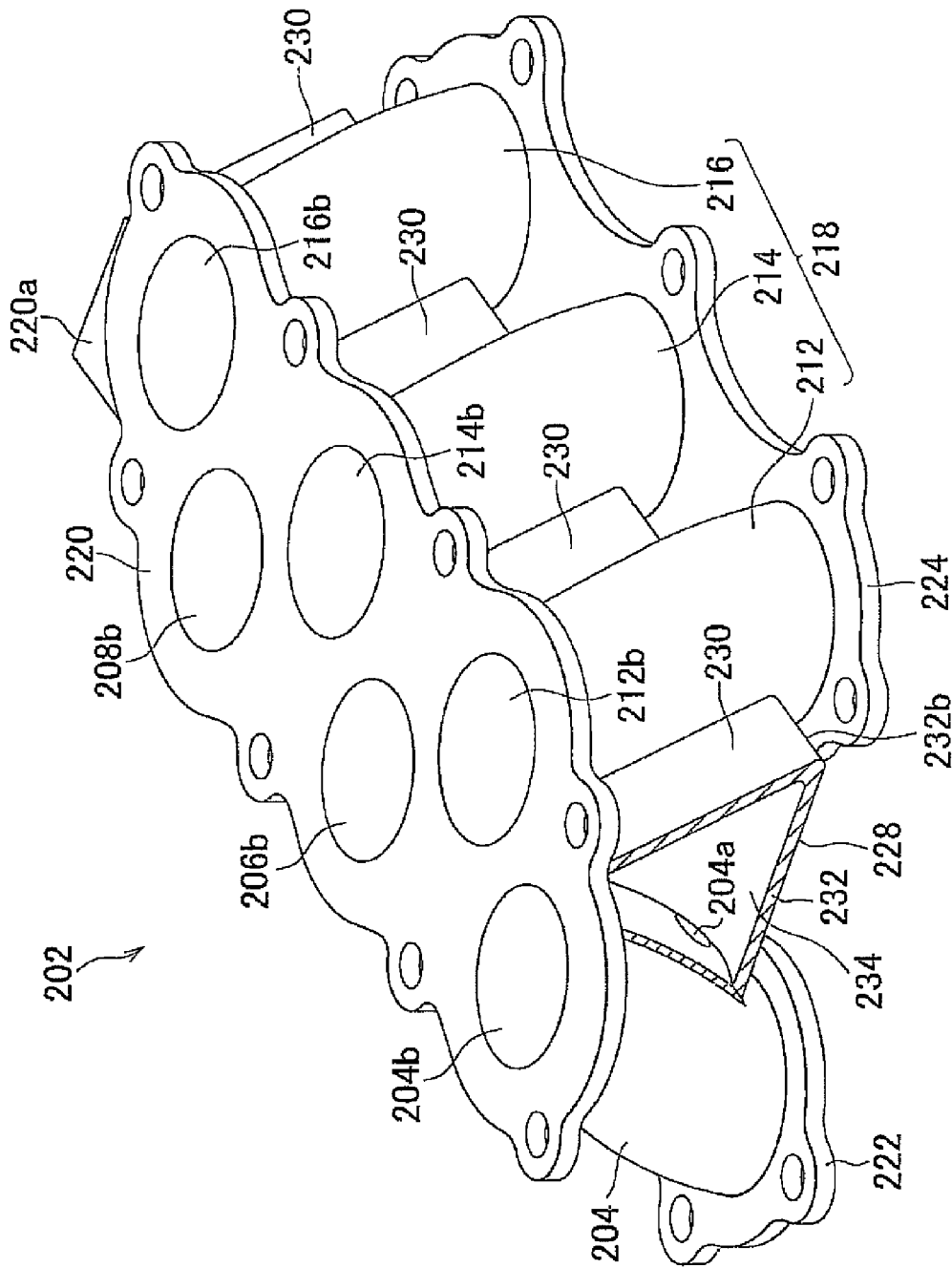

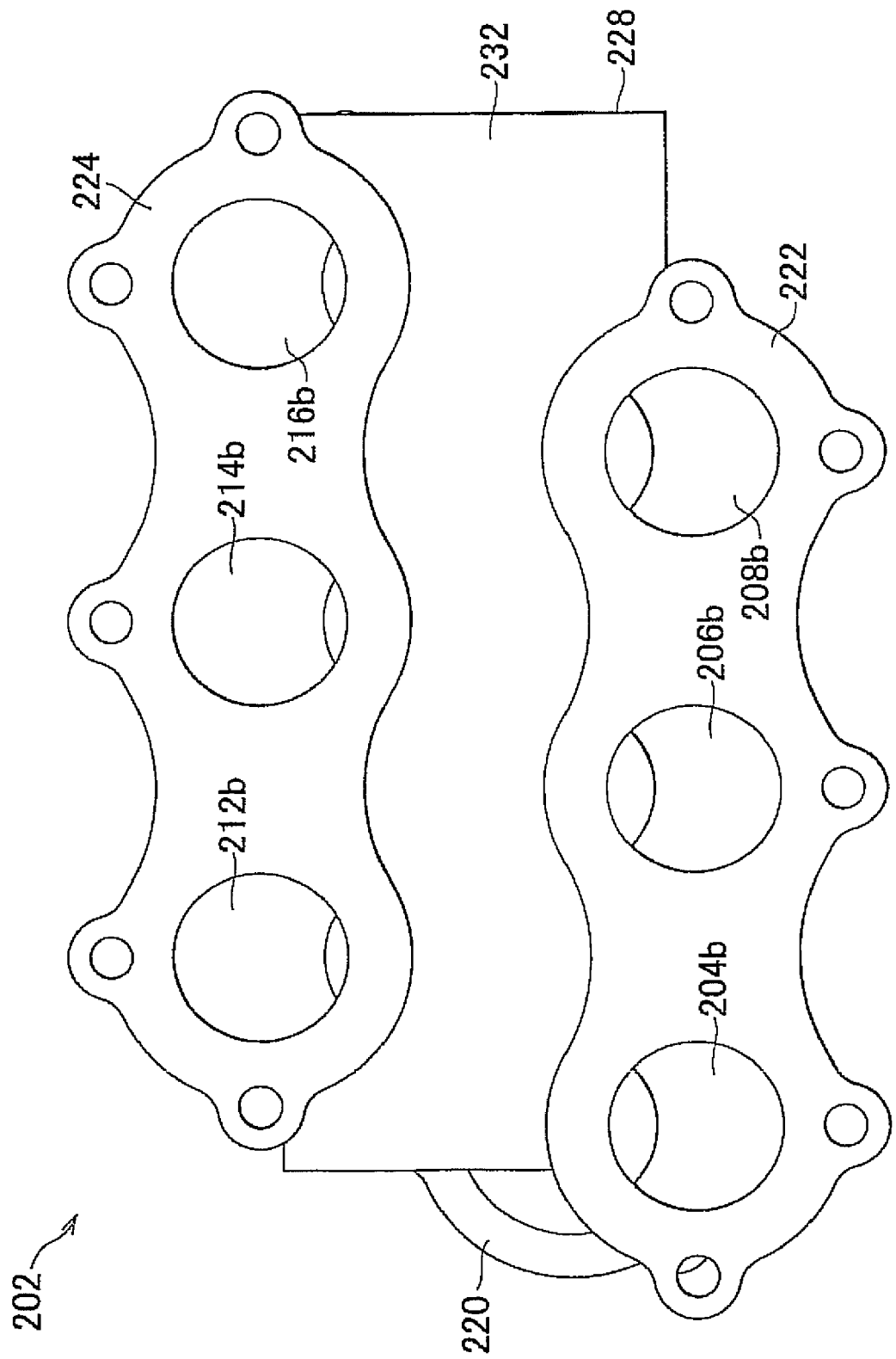

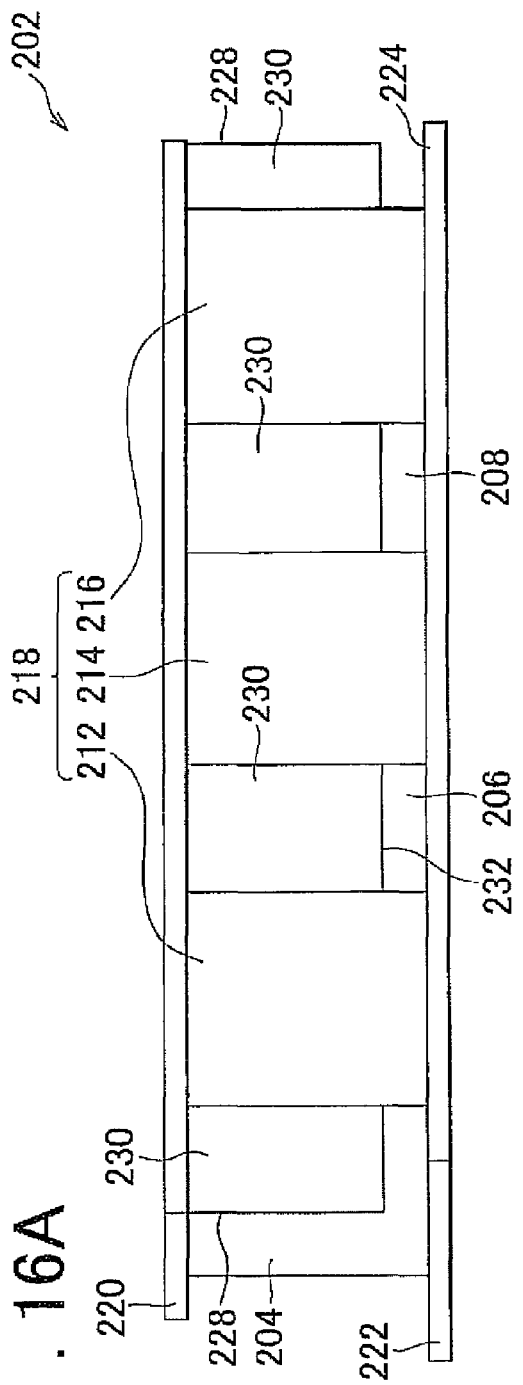
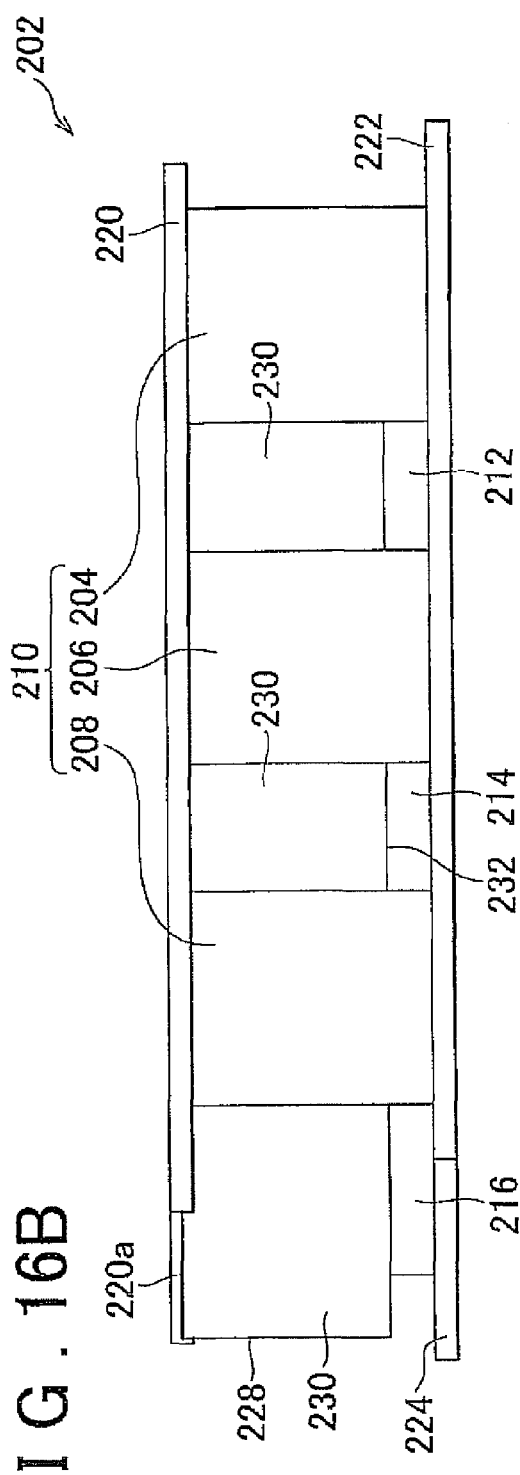
FIG. 16A
FIG. 16B

INTAKE PATH GAS INTRODUCING DEVICE AND INTERNAL COMBUSTION ENGINE

INCORPORATION BY REFERENCE

The disclosure of Japanese Patent Application No. 2008-138263 filed on May 27, 2008 including the specification, drawings and abstract is incorporated herein by reference in its entirety.

BACKGROUND OF THE INVENTION

1. Field of the Invention

The invention relates to an intake path gas introducing device that introduces gas from outside an intake path of an intake manifold into the intake path of the intake manifold of an internal combustion engine in which the intake gas is distributed into intake ports of two banks and to an internal combustion engine having the intake path gas introducing device disposed therein.

2. Description of the Related Art

As a configuration of a device that introduces gas into an intake path, for example, an exhaust gas recirculation device (EGR device) is available in which an exhaust circulation passage is led to an intake manifold and gas is introduced from an introducing passage formed integrally with the intake manifold into each intake path (see, for example, Japanese Patent Application Publication No. 6-81721 (JP-A-6-81721) (pages 4 and 5, FIGS. 1 to 3), Japanese Patent Application Publication No. 6-50216 (JP-A-6-50216) (page 3, FIGS. 1 to 4, 6, 8, and 9), Japanese Patent Application Publication No. 10-122071 (JP-A-10-122071) (pages 3 and 4, FIGS. 3 to 5), and Japanese Patent Application Publication No. 7-259657 (JP-A-7-259657) (page 3, FIG. 1). In the two-bank internal combustion engines described in these patent documents, space is saved by forming the exhaust introducing passages between the arrays in a zone where the intake manifold is divided into two arrays.

However, in the configurations described in JP-A-6-81721 and JP-A-6-50216, exhaust gas introducing passages are integrated so as to belong to respective two divided manifold arrays, and the exhaust gas introducing passage is completely separated for each intake manifold. As a result, the exhaust introducing passages do not reinforce the entire intake manifold, and stresses generated between the two manifold arrays can be concentrated between the exhaust gas introducing passages.

In the configurations described in JP-A-10-122071 and JP-A-7-259657, a common exhaust gas introducing passage is formed for two divided manifold arrays. However, in the configuration described in JP-A-10-122071, the exhaust gas introducing passage (gas reflux passage 40 in FIGS. 4 and 5 of JP-A-10-122071) is formed as a pipe with respect to the intake manifold, and branch tubes extend from this pipe to each intake manifold alternate, thereby distributing the exhaust gas. As a result, the exhaust introducing passages do not reinforce the entire intake manifold, and stresses generated between the two manifold arrays can concentrate in the connection portions of the intake manifolds and small branch tubes.

In the configuration described in JP-A-7-259657, a wall portion of an exhaust gas introducing passage (chamber 37 shown in FIG. 1 of JP-A-7-259657) is formed to protrude significantly at an acute angle downward, as if hanging down, with respect to a wall portion of an intake manifold (individual intake path 6 shown in FIG. 1 of JP-A-7-259657), and stresses generated between the two manifold arrays can concentrate in a gap portion between the wall portion of the exhaust gas introducing passage and the wall portion of the intake manifold.

Therefore, in the configurations described in JP-A-6-81721, JP-A-6-50216, JP-A-10-122071, and JP-A-7-259657, stresses generated between the two manifold arrays can easily concentrate, and the entire intake manifold cannot be said to be reinforced.

SUMMARY OF THE INVENTION

The invention provides an intake path gas introducing device that inhibits the concentration of stresses generated between two manifold arrays and in which the formation of gas introducing passage reinforces the entire intake manifold. Furthermore, the intake path gas introducing device makes it possible to reduce noise in internal combustion engines.

The intake path gas introducing device according to the first aspect of the invention is an intake path gas introducing device wherein the intake path gas introducing device introduces gas from outside an intake path of an intake manifold into the intake path in the intake manifold of an internal combustion engine in which two manifold arrays are aggregated on an upstream side and separated on a downstream side of an intake gas flow to distribute the intake gas to intake ports of two banks, the intake path gas introducing device including: two plate-shaped side wall portions that are provided integrally between two manifold arrays produced by the separation and along the manifold arrays and connected directly or indirectly at the aggregation side of the manifold arrays, thereby surrounding a columnar space extending between the manifold arrays in the arrangement direction thereof from the aggregation side of the manifold arrays; a plate-shaped bottom wall portion that forms a gas introducing passage in the arrangement direction of the manifold arrays between the plate-shaped side wall portions and the plate shape bottom wall portion by sealing a space surrounded by the two plate-shaped side wall portions by integration with the two plate-shaped side wall portions from the separation side of the manifold arrays; and openings that link the gas introducing passage to the intake path in each manifold and introduce gas from the gas introducing passage into each intake gas passage.

Thus, the gas introducing passage is formed by coating the columnar space between the manifold arrays with the plate-shaped bottom wall portion and two plate-shaped side wall portions connected on the aggregation side of the manifold arrays. Gas is introduced from the gas introducing passage into the intake paths via the openings. Here, the two plate-shaped side wall portions are connected directly or indirectly via another member on the aggregation side of the manifold arrays.

The integration of the plate-shaped side wall portions and plate-shaped bottom wall portion forms a strong structural body. In particular, because the plate-shaped side wall portions are integrated with the manifold arrays along the manifold arrays, and the plate-shaped bottom wall portion is integrated with the plate-shaped side wall portions, the plate-shaped bottom wall portion linearly connects the two manifold arrays. Therefore, a structure in which integration with the wall portions of the manifold arrays is performed at an acute angle is not produced. As a result, no gap is produced in which stresses generated between the two manifold arrays are concentrated between the plate-shaped bottom wall portion and the manifold arrays. By forming such a gas introducing passage, it is possible to improve the reinforcing ability for the entire intake manifold.

The intake path gas introducing device according to the second aspect of the invention is an intake path gas, introducing device wherein the intake path gas introducing device introduces gas from outside an intake path of an intake manifold into the intake path in the intake manifold of an internal combustion engine in which two manifold arrays are aggregated on an upstream side and separated on a downstream side of an intake gas flow to distribute the intake gas to intake ports of two banks, the intake path gas introducing device including: a plate-shaped bottom wall portion which covers a columnar space extending between the manifold arrays in the arrangement direction thereof from the separation side of the manifold arrays, and in which edge portions that extend in the arrangement direction of the manifold arrays are integrated with wall portions of the manifolds in the manifold arrays; a plate-shaped side wall portion that is disposed along the axial direction of the manifolds between the manifolds of the manifold arrays, integrated with the manifolds, thereby sealing gaps between the manifolds, and integrated with the late-shaped bottom wall portion on the separation side of the manifold arrays, thereby forming a gas introducing passage in the arrangement direction of the manifold arrays; and openings that link the gas introducing passage to the intake path in each manifold and introduce gas from the gas introducing passage into each intake path in wall portions of the manifolds in portions exposed inside the gas introducing passage.

Thus, the gas introducing passage is formed by covering the columnar space between the manifold arrays, including the wall portions of the manifolds, with the plate-shaped bottom wall portion and plate-shaped side wall portions. The gas is introduced into the intake path from the gas introducing passage via the openings.

The plate-shaped side wall portions are integrated with the manifolds so as to seal the gap between the manifolds in the manifold arrays and integrated with the plate-shaped bottom wall portion on the separation side of the manifold arrays. Hence, a strong structural body can be provided to the intake manifold.

Because the plate-shaped bottom wall portion is integrated with the wall portion of each manifold in the two manifold arrays, the two manifold arrays are connected linearly. Therefore, a structure in which integration with wall portions of the manifold arrays is performed at an acute angle is not produced. As a result, no gap is produced in which stresses generated between the two manifold arrays are concentrated between the plate-shaped bottom wall portion and the manifold arrays. By forming such a gas introducing passage, it is possible to improve the reinforcing ability for the entire intake manifold.

The side edge portions of the plate-shaped bottom wall portion may be formed linearly in the arrangement direction of the manifold arrays.

Where the side edge portions of the plate-shaped bottom wall portion are formed linearly in the arrangement direction of the manifold arrays, stresses are also prevented from concentrating in the arrangement direction in the side edge portions of the plate-shaped bottom wall portion. Therefore, the reinforcing ability for the entire intake manifold can be further improved.

The side edge portions of the plate-shaped bottom wall portion may extend in the direction of withdrawing from the columnar space in gap portions between the manifolds in the manifold arrays.

Thus, the side edge portions of the plate-shaped bottom wall portion may extend in the direction of withdrawing from the columnar space in gap portions of the manifolds. As a result of such an extension, the integration of the two manifold arrays can be strengthened, the reinforcing ability for the entire intake manifold can be further improved, and stress concentration can be further decreased.

The side edge portions of the plate-shaped bottom wall portion may extend to the narrowest portion in the gap portions between the manifolds in the manifold arrays.

By thus extending the side edge portions of the plate-shaped bottom wall portion to the narrowest portion in the gap portions between the manifolds, it is possible to improve further the reinforcing ability for the entire intake manifold and further reduce the stress concentration.

The side edge portions of the plate-shaped bottom wall portion may extend to the outermost portion in the gap portions between the manifolds in the manifold arrays.

By thus extending the side edge portions of the plate-shaped bottom wall portion to the outermost portion in the gap portions between the manifolds, it is possible to improve further the reinforcing ability for the entire intake manifold and greatly enhance the effect of reducing stress concentration.

The plate-shaped bottom wall portion, plate-shaped side wall portions, and intake manifold may be molded integrally from a metal by casting.

By thus molding the plate-shaped bottom wall portion, plate-shaped side wall portions, and intake manifold integrally from a metal by casting, it is possible to obtain a stronger structure, further improve the reinforcing ability for the entire intake manifold, and greatly enhance the effect of reducing stress concentration.

The plate-shaped side wall portions and intake manifold may be molded integrally from a metal by casting, and the plate-shaped bottom wall portion may be integrated with the integrally molded configuration by joining.

Thus, an integrated configuration may be obtained by joining the plate-shaped bottom wall portion to the configuration obtained by integrally molding the plate-shaped side wall portions and intake manifold by metal casting. As a result, it is possible to obtain a stronger structure, further improve the reinforcing ability for the entire intake manifold, and greatly enhance the effect of reducing stress concentration.

The intake manifold may be a sub-intake manifold interposed between a surge tank and intake ports.

Thus, the intake path gas introducing device may be configured in a sub-intake manifold and the above-described effects can be demonstrated. The gas introducing passage may introduce exhaust gas of the internal combustion engine in the intake gas.

The object of introduction with the gas introducing passage may be exhaust gas, and the above-described effects can be demonstrated in such an intake path gas introducing device. The gas introducing passage may introduce blow-by gas of the internal combustion engine or fuel vapor produced by fuel evaporation from a fuel tank in the intake gas.

The object of introduction with the gas introducing passage may be blow-by gas or fuel vapor, and the above-described effects can be demonstrated in such an intake path gas introducing device. The internal combustion engine according to the second aspect of the invention includes the intake path gas introducing device according to the first aspect that is assembled with a cylinder head of the internal combustion engine; and a fuel injection valve disposed between two banks.

Where a fuel injection valve is thus disposed between the two banks, the fuel injection valve is disposed below the plate-shaped bottom wall portion of the intake path gas introducing device. As a result, a sound shielding effect produced by the banks and intake manifold is significant due to the presence of the intake path gas introducing devices more particularly the plate-shaped bottom wall portion. Accordingly, in addition to the above-described effects of improving the reinforcing ability for the entire intake manifold and reducing stress concentration, sound emitted from the fuel injection valve can be shielded and a significant noise reduction effect can be produced.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3 is a bottom view of the sub-intake manifold of Embodiment 1;

FIGS. 4A and 4B are a front view and a rear view of the sub-intake manifold of Embodiment 1;

FIGS. 11A and 11B are a front view and a rear view of the sub-intake manifold of Embodiment 2;

FIG. 13 is a partially cut-out perspective view of a sub-intake manifold of Embodiment 3;

FIG. 15 is a bottom view of the sub-intake manifold of Embodiment 3;

FIGS. 16A and 16B are a front view and a rear view of the sub-intake manifold of Embodiment 3;

DETAILED DESCRIPTION OF EMBODIMENTS

Embodiment 1

Figure 1:
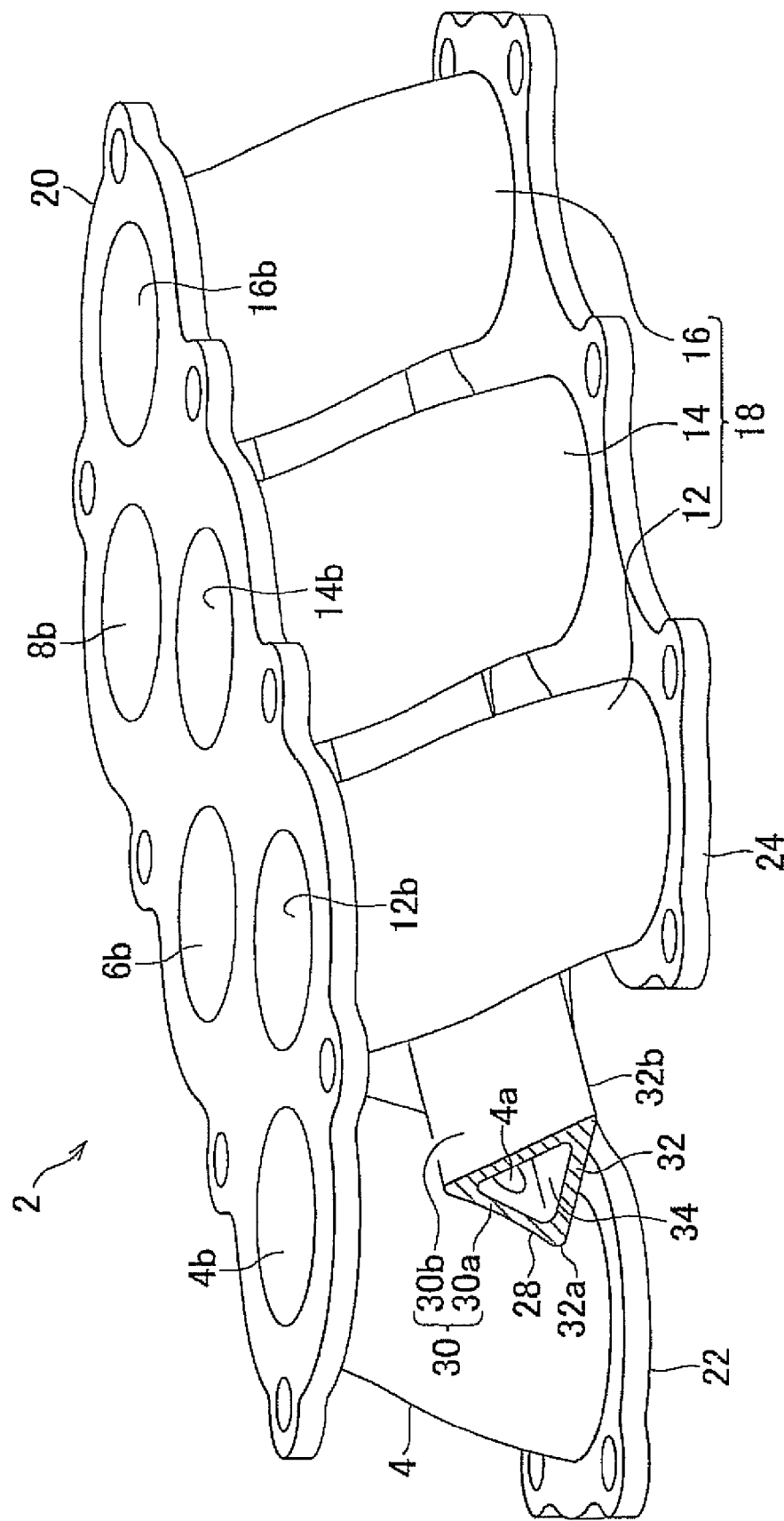
FIG. 1 is a partially cut-out perspective view of a sub-intake manifold of Embodiment 1.
Figure 2:
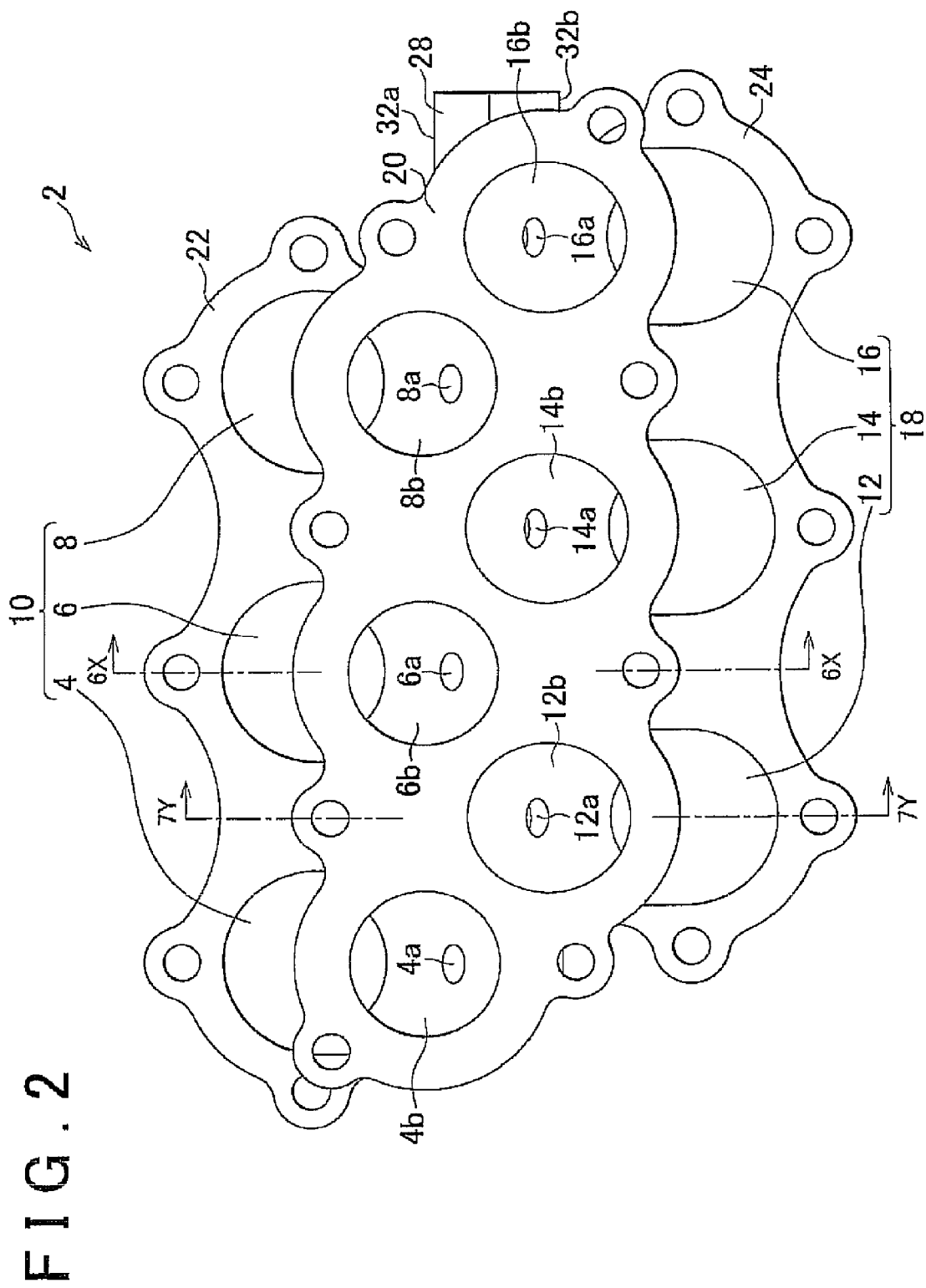
FIG. 2 is a plan view of the sub-intake manifold of Embodiment 1.

FIGS. 1 to 7 show a configuration of a sub-intake manifold 2 of Embodiment 1 of the invention. FIG. 1 is a partially cut-out perspective view. FIG. 2 is a plan view. FIG. 3 is a bottom view. FIG. 4A is a front view. FIG. 4B is a rear view. FIG. 5A is a left-side view. FIG. 5B is a right-side view. FIGS. 6A and 6B illustrate a state obtained by cutting along a 6X-6X line in FIG. 2. FIG. 6A is a perspective view. FIG. 6B is a cross-sectional view. FIGS. 7A and 7B show a state obtained by cutting along a 7Y-7Y line in FIG. 2. FIG. 7A is a perspective view, and FIG. 7B is a cross-sectional view.

The sub-intake manifold 2 constitutes part of an intake manifold of a V-type six-cylinder internal combustion engine. The sub-intake manifold 2 is provided with a manifold array 10 for a right bank in which three manifolds 4, 6, and 8 for a right bank are arranged in a row and a manifold array 18 for a left bank in which three manifolds 12, 14, and 16 for a left bank are arranged in a row.

The two manifold arrays 10, 18 that are aggregated on the intake upstream side and separated on the intake downstream side are assembled in one flange 20 on the aggregation side. The flange 20 is connected to an intake manifold portion on a surge tank side.

On the separation side, the manifold arrays 10, 18 are completely separated in two rows, and flanges 22, 24 are provided at distal ends of respective rows. The flange 22 for the right bank is connected to a cylinder head of the right bank, and the manifolds 4, 6, and 8 are connected to the intake ports of each cylinder formed in the cylinder head. The flange 24 for the left bank is connected to a cylinder head of the left bank, and the manifolds 12, 14, and 16 are connected to the intake ports of each cylinder formed in the cylinder head. Therefore, the sub-intake manifold 2 is present between the surge tank and cylinder head, thereby making it possible to supply an external air that is sucked in by the surge tank as intake air into intake ports of the cylinders.

An intake path gas introducing device 28 in the form of a triangular column is formed in a columnar space 26 (FIGS. 5A and 5B) formed between the two manifold arrays 10, 18. The outer shape of the intake path gas introducing device 28 is configured by a side wall portion 30 in the form of inverted V and a plate-shaped bottom wall portion 32. The side wall portion 30 in the form of inverted V is configured by two plate-shaped side wall portions 30a, 30b formed integrally along the manifold arrays 10, 18 between the two manifold arrays 10, 18. The plate-shaped side wall portions 30a, 30b are directly connected on the aggregation side of the manifold arrays 10, 18. Here, the components are formed integrally. As a result, the side wall portion 30 in the form of inverted V is in a state of surrounding the columnar space extending between the manifold arrays 10, 18 in the arrangement direction thereof from the aggregation side of the manifold arrays 10, 18.

The space surrounded by the side wall portion 30 in the form of inverted V is sealed by integrating the plate-shaped bottom wall portion 32 with the side wall portion 30 in the form of inverted V from the separation side of the manifold arrays 10, 18. As a result, a gas introducing passage 34 in the arrangement direction of the manifold arrays 10, 18 is formed between the plate-shaped bottom wall portion and the side wall portion 30 in the form of inverted V. This gas introducing passage 34 in the form of a triangular column is closed at the distal end and base end thereof with plate materials 36 and 37. A gas connection portion 38 is formed in the plate material 37 of the base end, and the gas connection portion 38 is connected to an exhaust recirculation passage from an exhaust pipe. FIG. 1 shows a state in which the plate material 36 of the distal end is cut out.

Openings 4a, 6a, and 8a that are linked to a space between the gas introducing passage 34 and intake pats 4b, 6b, and 8b in the manifolds 4, 6, and 8 are formed in the plate-shaped side wall portion 30a integrated with the manifold array 10 for the right bank in the side wall portion 30 in the form of inverted V. The openings are formed in the integration portion of the plate-shaped side wall portion. As a result exhaust gas can be introduced from the gas introducing passage 34 in the intake paths 4b, 6b, and 8b in the manifolds 4, 6, and 8 of the right bank.

Furthermore, openings 12a, 14a, and 16a that are linked to a space between the gas introducing passage 34 and intake paths 12b, 14b, and 16b in the manifolds 12, 14, and 16 are formed in the plate-shaped side wall portion 30b integrated with the manifold array 18 for the left bank in the side wall portion 30 in the form of inverted V. The openings are formed in the integration portion of the plate-shaped side wall portion. As a result, exhaust gas can be introduced from the gas introducing passage 34 in the intake paths 12b, 14b, and 16b in the manifolds 12, 14, and 16 of the left bank.

The sub-intake manifold 2 is integrally formed by casting from an aluminum alloy or an iron alloy, with the exception of plate materials. 36 and 37 that seal the distal end and base end of the gas introducing passage 34. The sub-intake manifold 2 is formed by joining the plate materials 36 and 37 to such an integrally molded body.

The following effects can be obtained with the above-described Embodiment 1. (A) A strong structural body is formed by integrating the side wall portion 30 in the form of inverted V and the plate-shaped bottom wall portion 32 that form the gas introducing passage 34. In particular, a very strong structural body is obtained because a triangular columnar shape is formed.

Figure 5A:
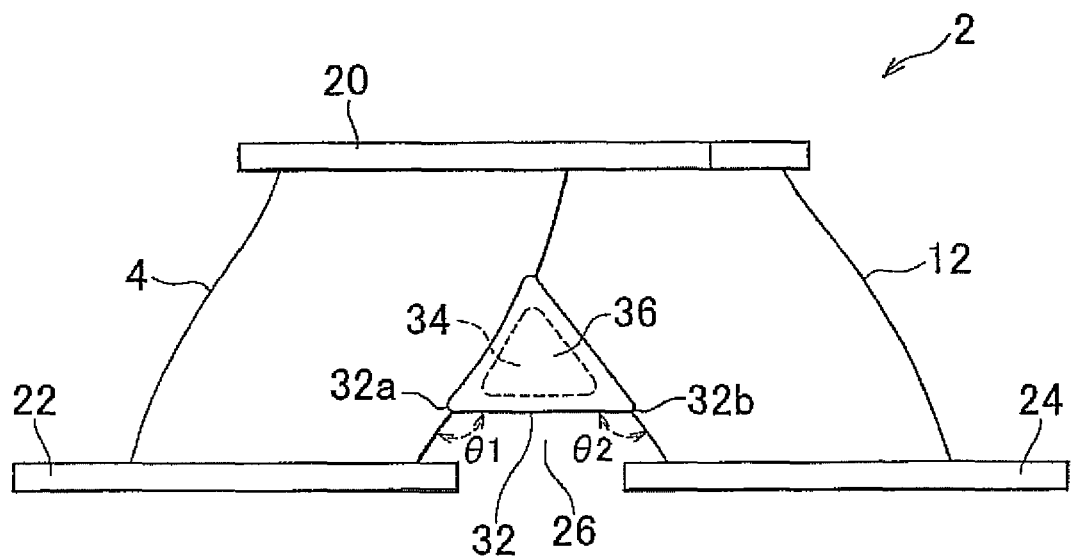
FIGS. 5A and 5B are a left-side view and a right-side view of the sub-intake manifold of Embodiment 1.
Figure 5B:
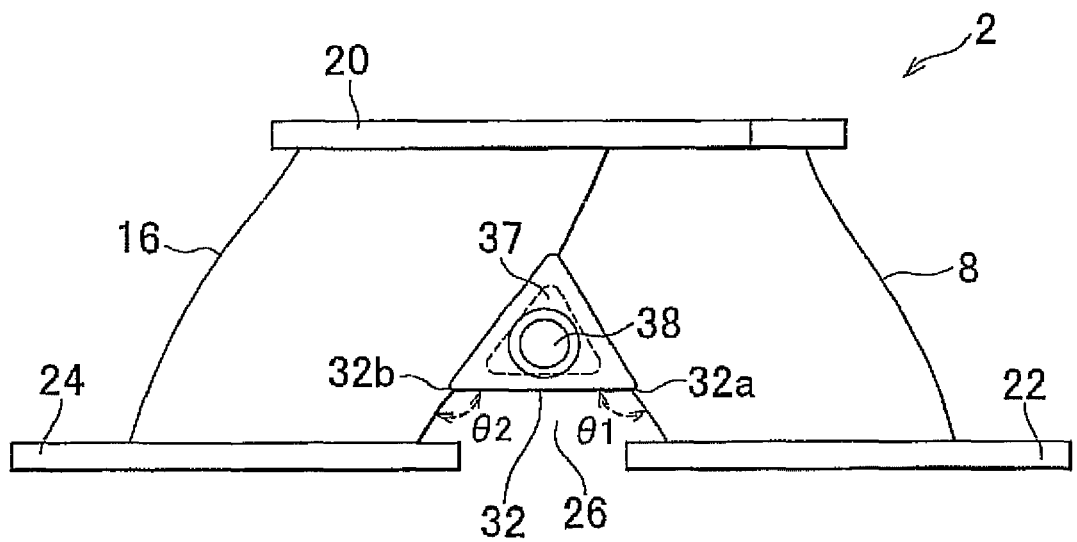
Figure 6A:
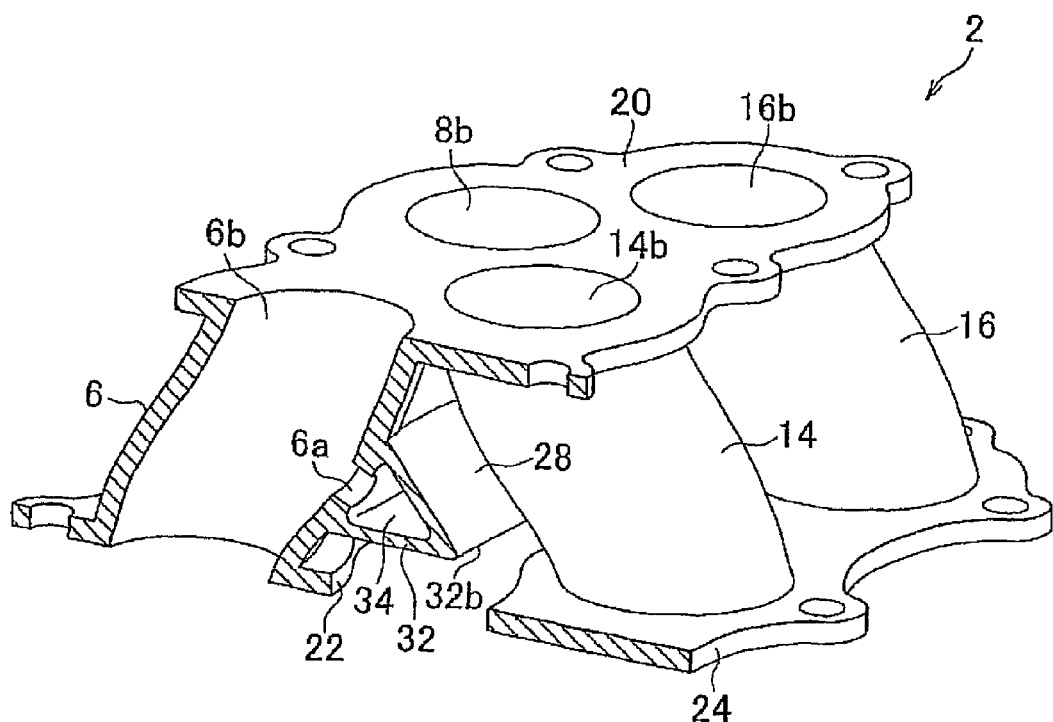
FIGS. 6A and 6B are explanatory drawings illustrating a cross-sectional configuration of the sub-intake manifold of Embodiment 1.
Figure 6B:
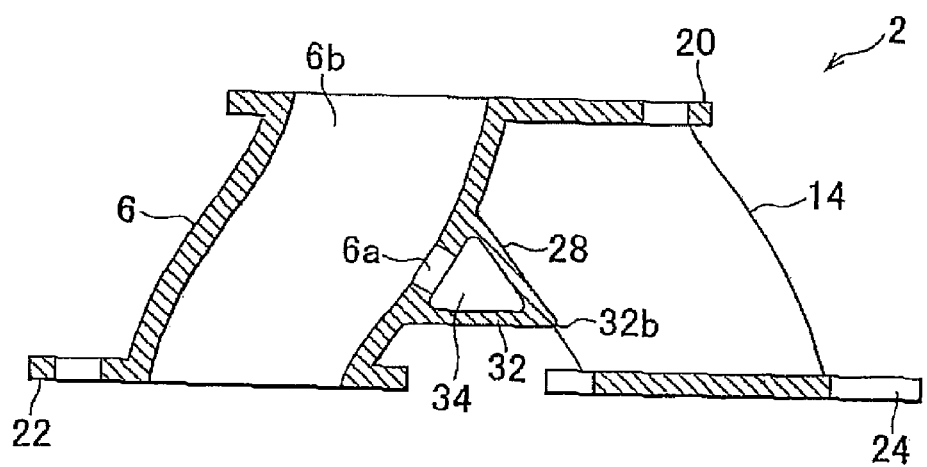
Figure 7A:
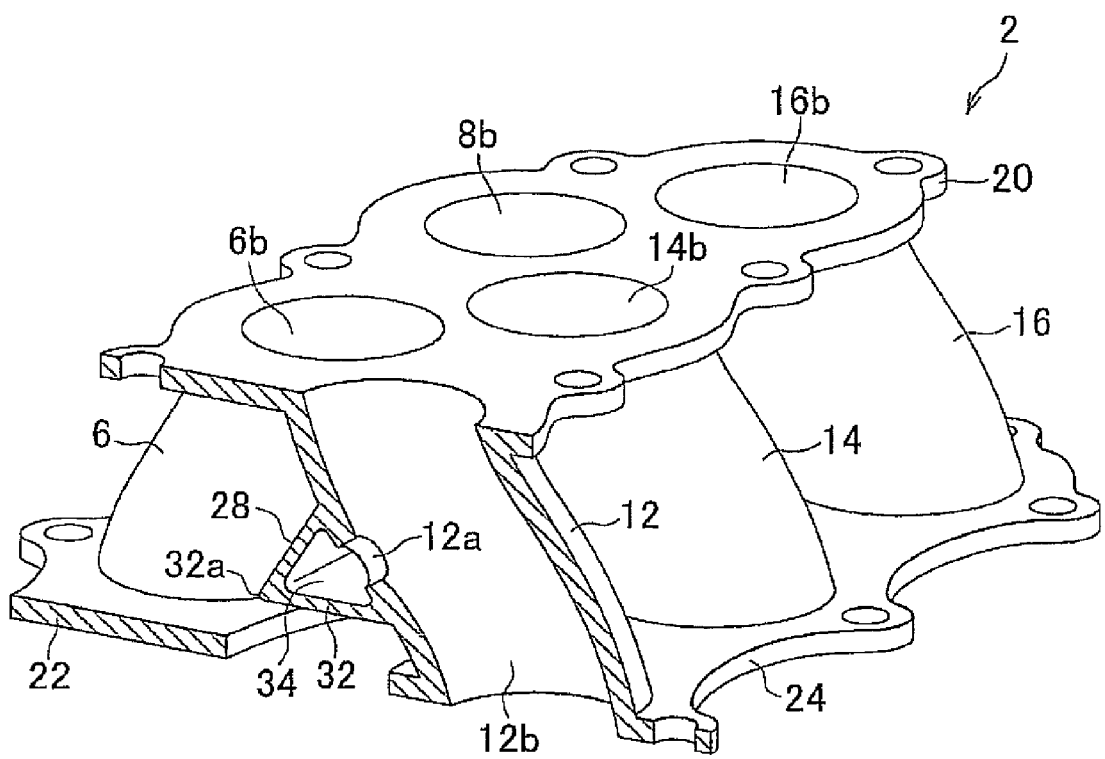
FIGS. 7A and 7B are explanatory drawings illustrating a cross-sectional configuration of the sub-intake manifold of Embodiment 1.
Figure 7B:
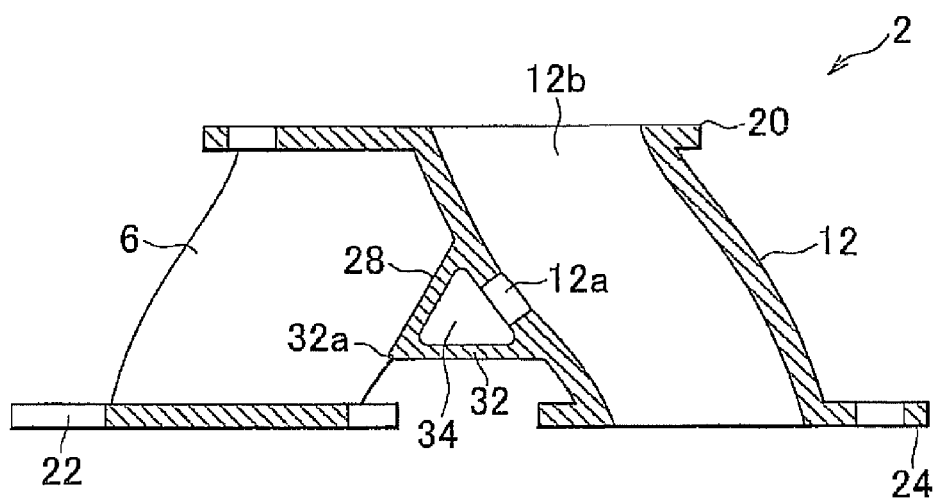

Furthermore, because plate-shaped side wall portions 30a, 30b of the side wall portion 30 in the form of inverted V are integrated with two respective manifold arrays 10, 18, the two manifold arrays 10, 18 are linearly connected by the plate-shaped bottom wall portion 32. For this reason, angles θ1, θ2 between the bottom surface of the plate-shaped bottom wall portion 32 and the wall surface of the manifolds 4 to 16 are obtuse angles as shown in FIGS. 5A and 5B, and a structure in which the bottom surface protrudes at an acute angle with respect to the wall surface of the manifolds 4 to 16 and is integrated therewith, as described in JP-A-7-259657, is not obtained. Therefore, a gap such that causes the stresses generated between the two manifold arrays 10, 18 to concentrate between the plate-shaped bottom wall portion 32 and manifold arrays 10, 18 does not appear.

In such a sub-intake manifold 2, by forming the gas introducing passage 34, it is possible to improve the reinforcing ability for the entire sub-intake manifold 2. Furthermore, the intake system of the internal combustion engine incorporating the sub-intake manifold 2 is also reinforced and endurance is improved.

(B) The side edge portions 32a, 32b on both sides of the plate-shaped bottom wall portion 32 are formed linearly in the arrangement direction of the manifold arrays 10, 18. As a result, stresses are also prevented from concentrating in the arrangement direction in the plate-shaped bottom wall portion 32. Therefore, the reinforcing ability for the entire sub-intake manifold 2 can be further improved.

(C) The plate-shaped bottom wall portion 32, side wall portion 30 in the form of inverted V, and sub-intake manifold 2 are formed integrally by metal casting. As a result, a stronger structure can be obtained, the reinforcing ability for the entire sub-intake manifold 2 can be further improved, and the effect of reducing stress concentration can be enhanced.

Embodiment 2

Figure 8:
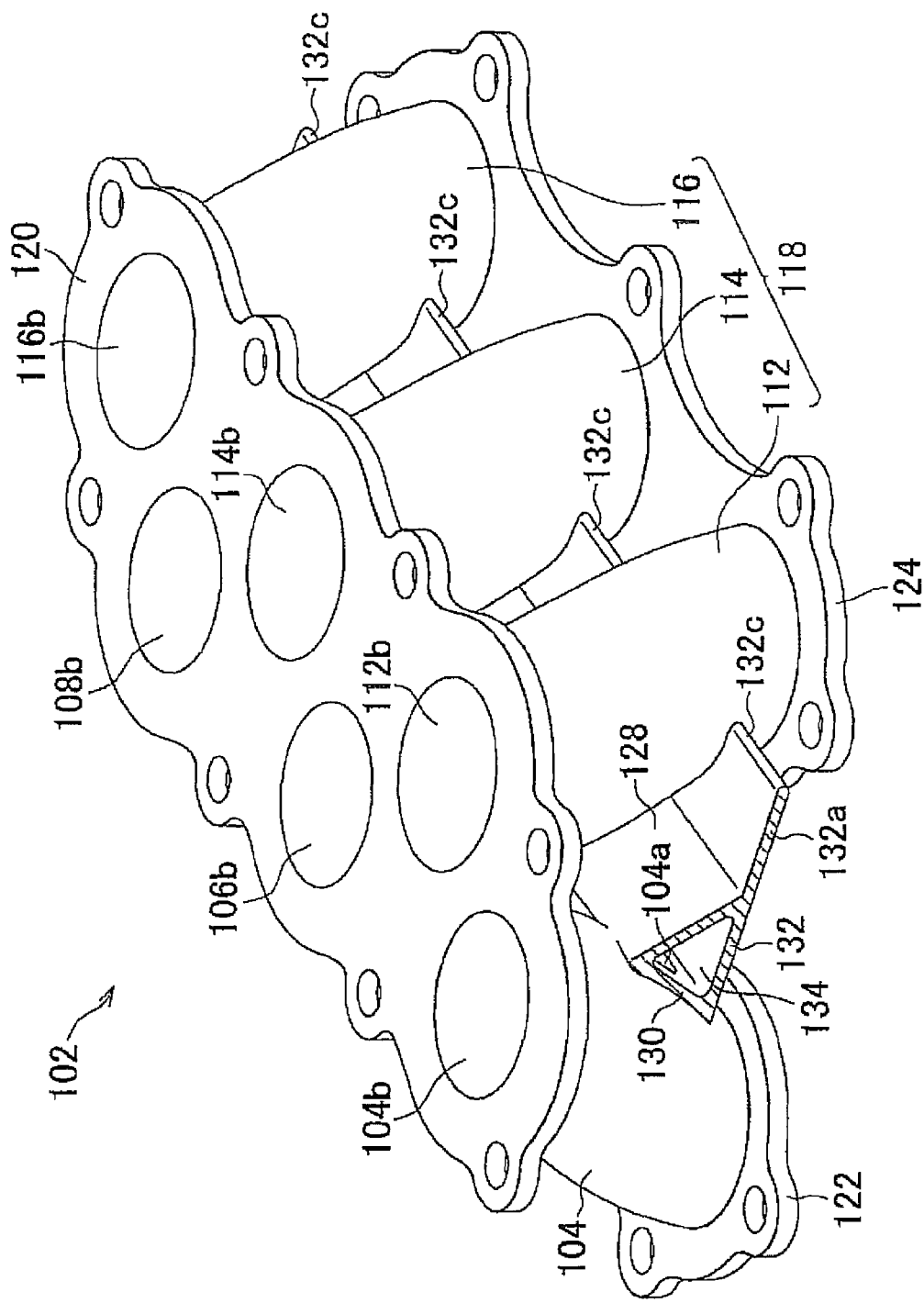
FIG. 8 is a partially cut-out perspective view of a sub-intake manifold of Embodiment 2.
Figure 9:
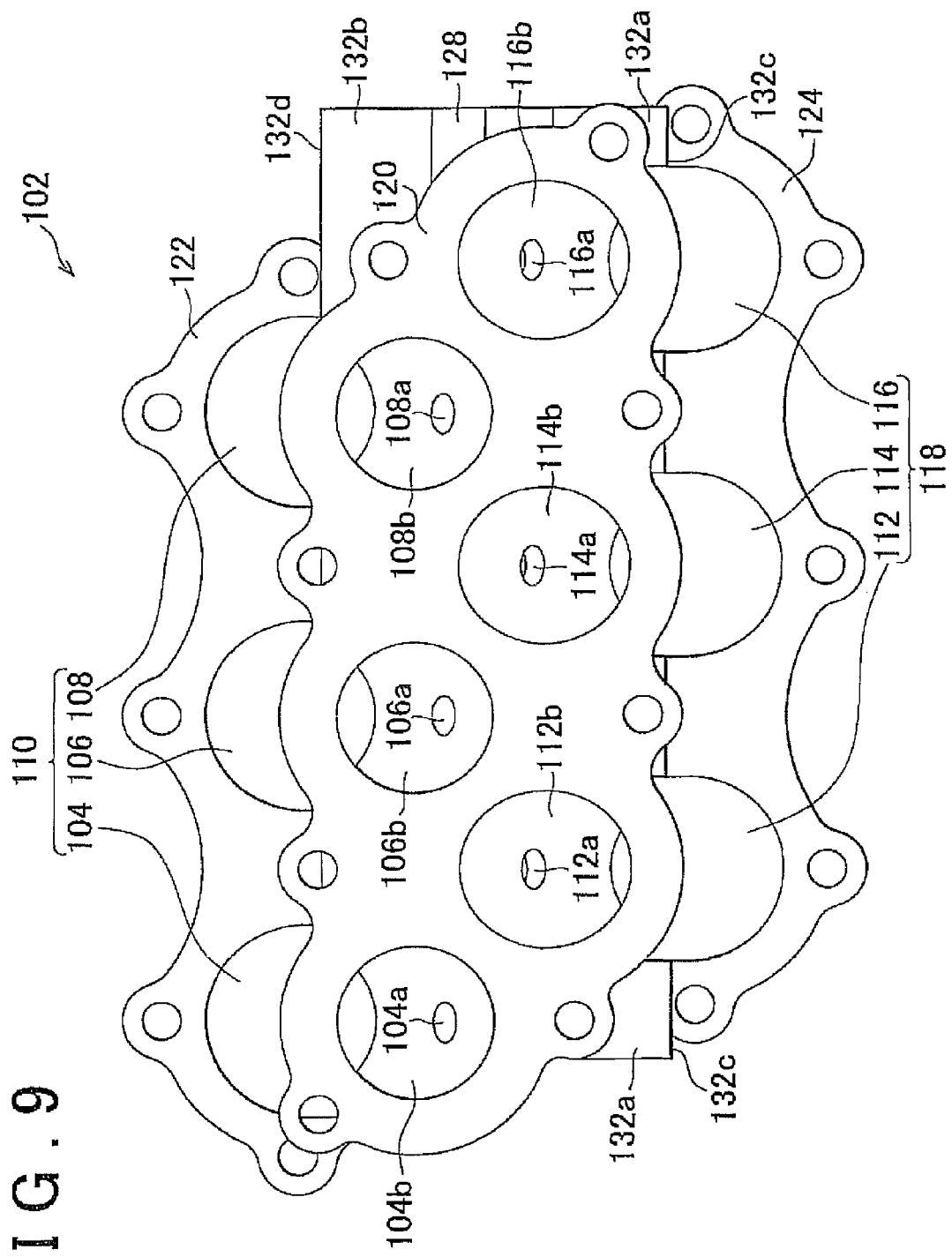
FIG. 9 is a plan view of the sub-intake manifold of Embodiment 2.
Figure 10:
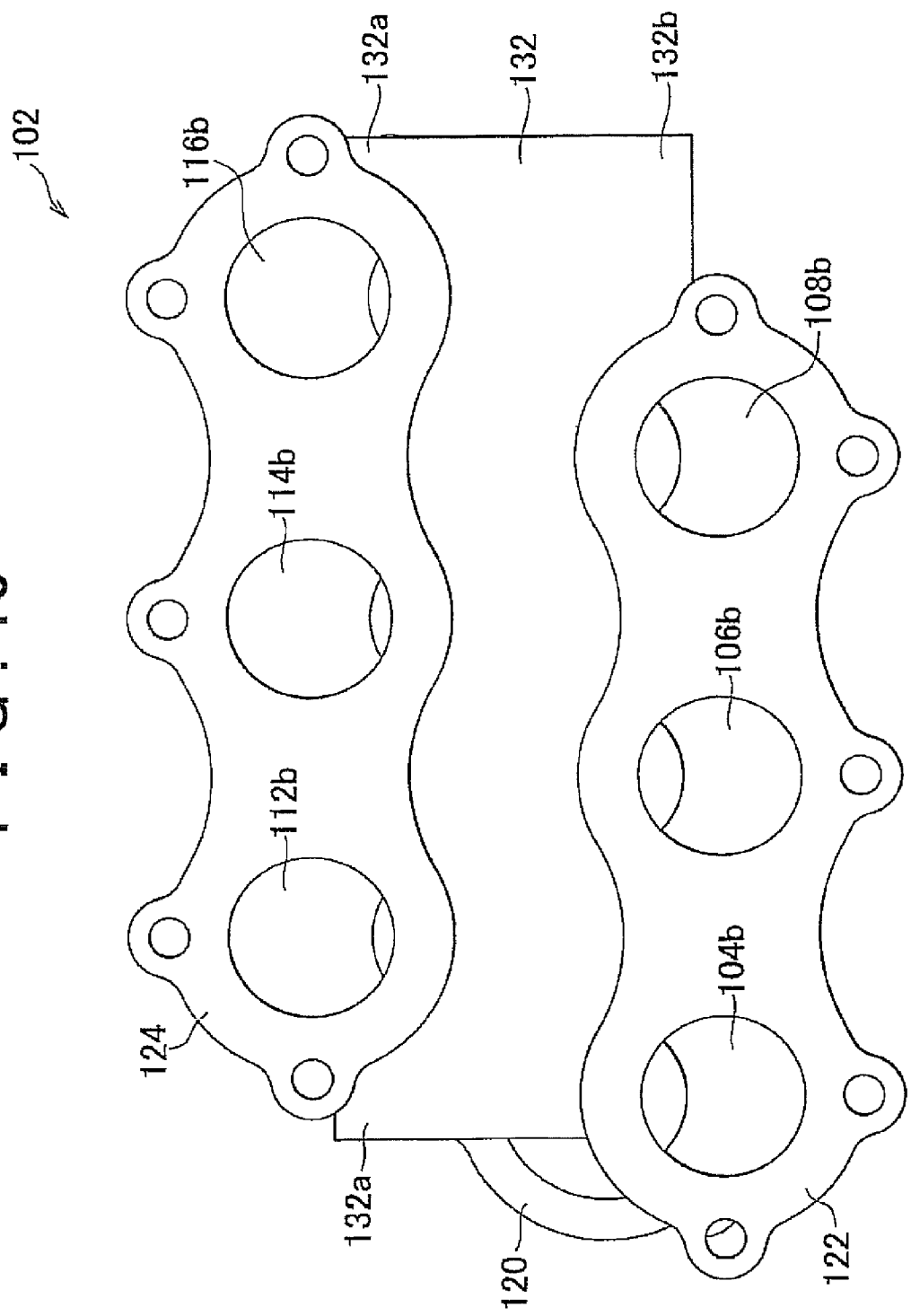
FIG. 10 is a bottom view of the sub-intake manifold of Embodiment 2.
Figure 12A:
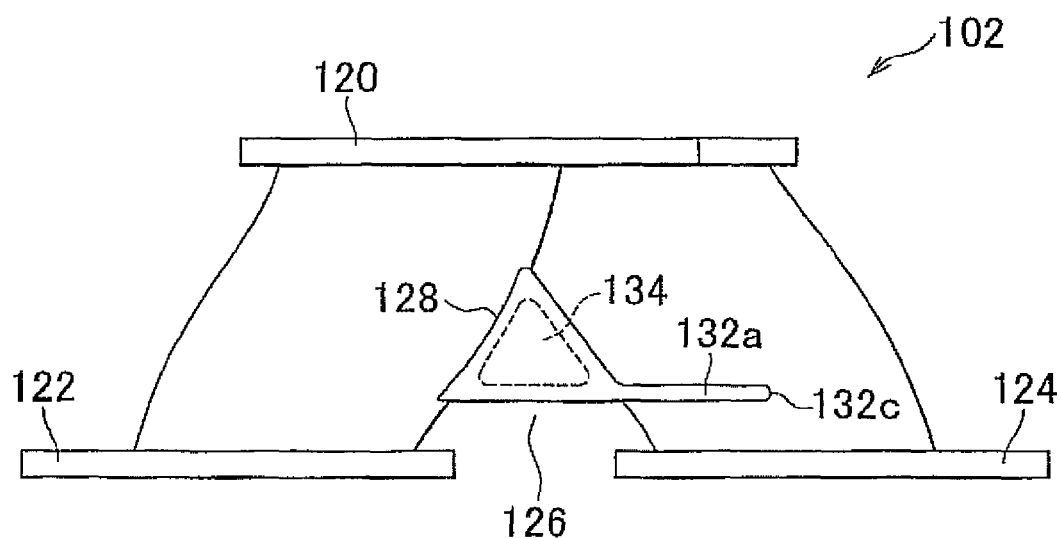
FIGS. 12A and 12B are a left-side view and a right-side view of the sub-intake manifold of Embodiment 2.
Figure 12B:
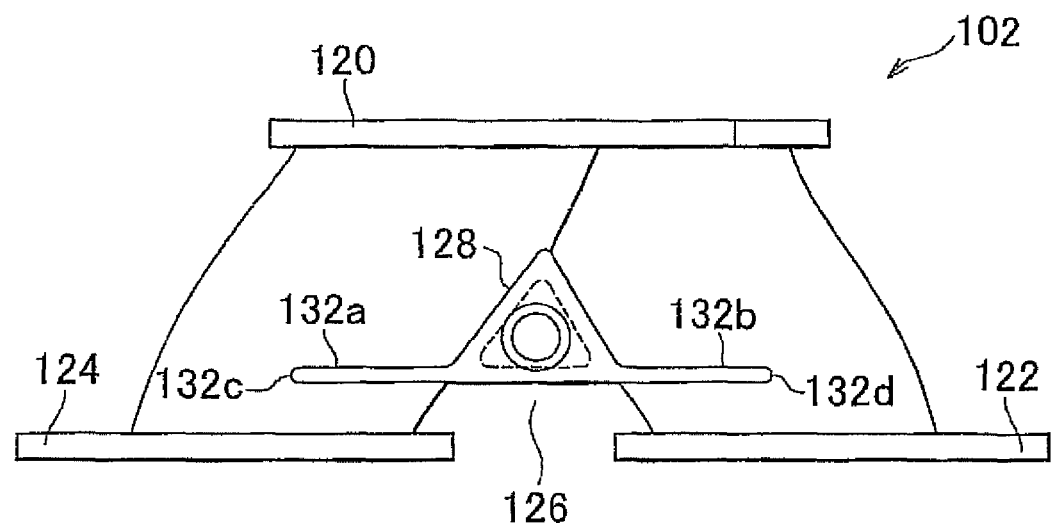

FIGS. 8 to 12 show a configuration of a sub-intake manifold 102 of Embodiment 2 of the invention. FIG. 8 is a partially cut-out perspective view. FIG. 9 is a plan view. FIG. 10 is a bottom view. FIG. 11A is a front view. FIG. 11B is a rear view. FIG. 12A is a left-side view, and FIG. 12B is a right-side view. FIG. 8 shows a state in which a distal end portion of an intake path gas introducing device 128 is cut out.

In Embodiment 2, both side portions 132a, 132b of the plate-shaped bottom wall portion 132 constituting the intake path gas introducing device 128 extend in the direction of withdrawing from a columnar space 126 (FIGS. 12A and 12B) in gap portions between manifolds 104, 106, 108, 112, 114, and 116 in manifold arrays 110, 118. More specifically, the side edge portions 132c, 132d of the side portions extend to the narrowest portion in the gap portions of the manifolds 104 to 116.

Other components, that is, manifolds 104 to 116, openings 104a to 116a, intake paths 104b to 116b, flanges 120 to 124, side wall portion 130 in the form of inverted V, and gas introducing passage 134 are identical in shape to the corresponding 6 components of Embodiment 1.

The following effects are obtained with the above-described Embodiment 2. (A) In addition to the effects demonstrate in Embodiment 1, the side edge portions 132c, 132d of the plate-shaped bottom wall portion 132 extend, as described hereinabove, in the direction of withdrawing from the columnar space 126 in the gap portions between the manifolds 104 to 116, in particular to the narrowest portion in the gap portions between the manifolds 104 to 116. As a result, the integration of the manifold arrays 110, 118 can be further enhanced, reinforcing ability for the entire sub-intake manifold 102 can be further improved, and stress concentrations can be further reduced.

Embodiment 3

Figure 14:
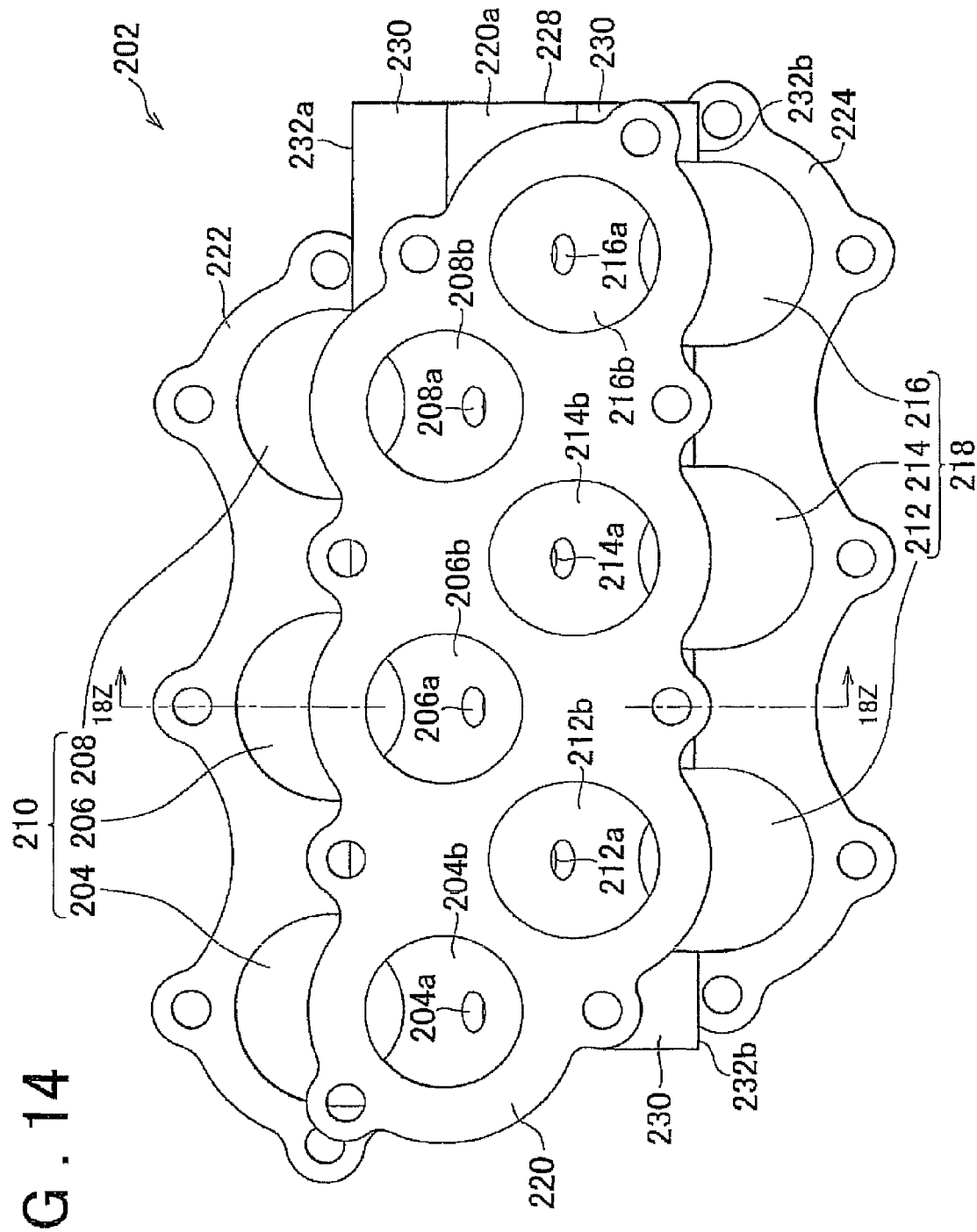
FIG. 14 is a plan view of the sub-intake manifold of Embodiment 3.
Figure 17A:
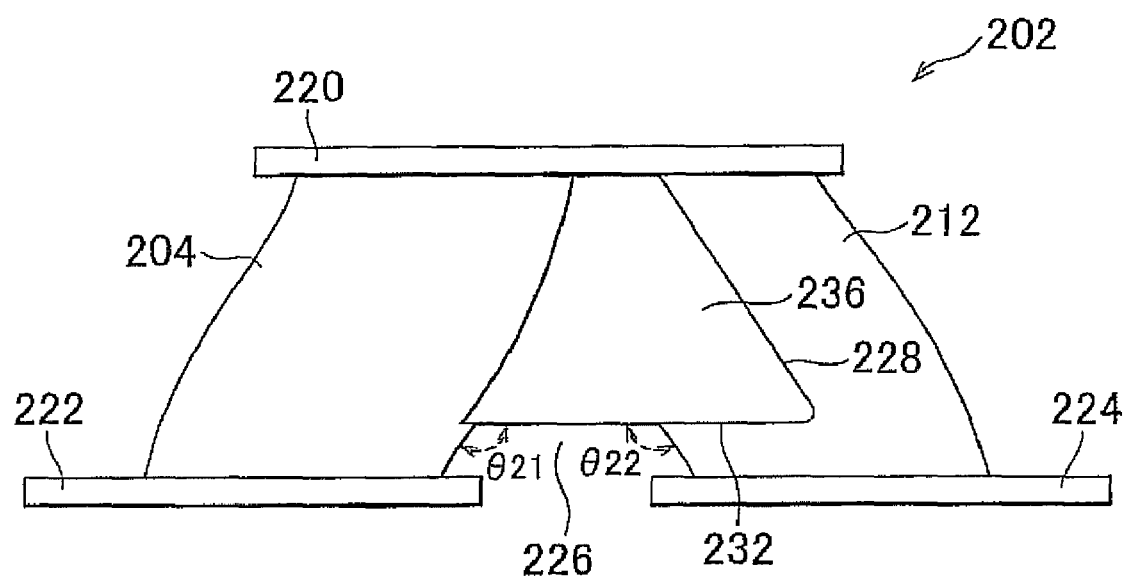
FIGS. 17A and 17B are a left-side view and right-side view of the sub-intake manifold of Embodiment 3.
Figure 17B:
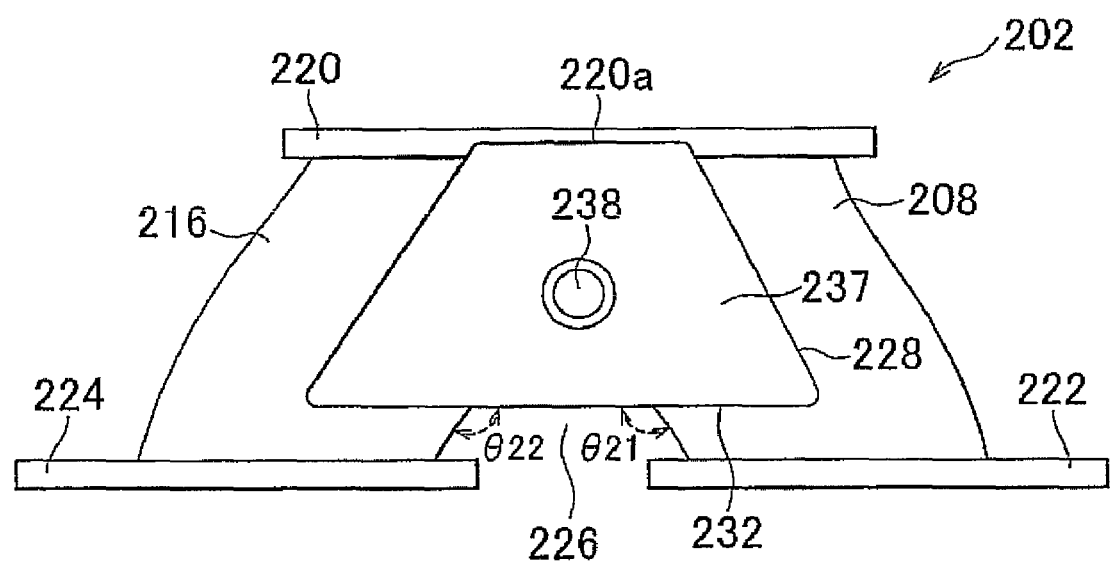
Figure 18A:
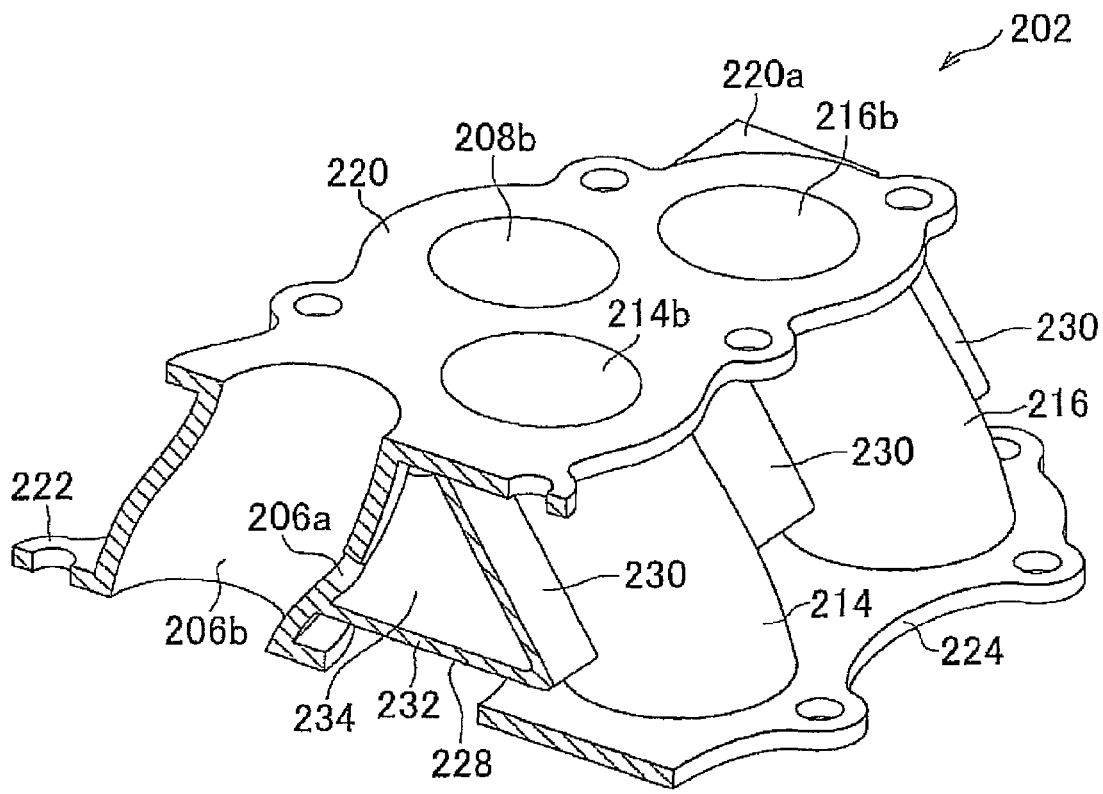
FIGS. 18A and 18B are explanatory drawings illustrating cross-sectional configurations of the sub-intake manifold of Embodiment 3.
Figure 18B:
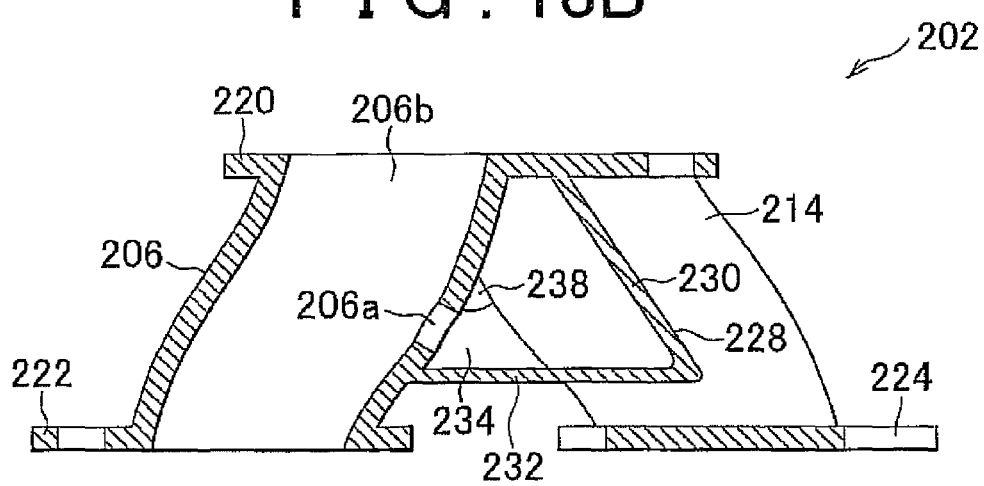

FIGS. 13 to 18 show a configuration of a sub-intake manifold 202 of Embodiment 3 of the invention. FIG. 13 is a partially cut-out perspective view. FIG. 14 is a plan view. FIG. 15 is a bottom view. FIG. 16A is a front views. FIG. 16B is a rear view. FIG. 17A is a left-side view, and FIG. 17B is a right-side view. FIG. 18 is a view obtained by cutting along a 18Z-18Z line in FIG. 14. FIG. 18A is a perspective view, and FIG. 18B is a cross-sectional view. FIG. 13 shows a state in which a plate material 236 of a distal end portion of an intake path gas introducing device 228 is cut out.

In the intake path gas introducing device 228 of embodiment 3, a plate-shaped side wall portion 230 serving to seal a columnar space 226 formed between two manifold arrays 210, 218 is disposed along the axial direction of manifolds 204 to 216 in gaps between the manifolds 204 to 216 in the manifold arrays 210, 218 and integrated with the manifolds 204 to 216. Furthermore, in the three manifolds 208, 212, and 216, the plate-shaped side wall portion 230 is provided also outside in the arrangement direction and integrated with the manifolds 208, 212, and 216.

These plate-shaped side wall portions 230 are integrated with the side edge portions 232a, 232b of the plate-shaped bottom wall portion 232 on the side where the manifold arrays 210, 218 are separated. The upper end of the plate-shaped side wall portion 230 is integrated with the flange 220. However, in a portion where the flange 220 is not present, a top wall portion 220a serving as an alternative for the flange 220 is provided and the upper end side of the plate-shaped side wall portion 230 is sealed.

Furthermore, portions of the plate-shaped bottom wall portion 232 that are not integrated with the lower end of the plate-shaped side wall portion 230 at the side edge portions 232a, 232b of the plate-shaped bottom wall portion are integrated with wall portions of the manifolds 204 to 216. As a result, the columnar space 226 is sealed and the gas introducing passage 234 in the form of a triangular column is formed in a sealed state. The distal end portion and base end portion of the gas introducing passage 234 have a trapezoidal shape. Plate materials 236, 237 (FIGS. 17A and 17B) are joined for sealing to the distal end portion and base end portion. Furthermore, a gas connection portion 238 is formed in the plate material 237 of the base end portion, and the gas connection portion is connected to an EGR passage from an exhaust pipe.

Other components, that is, manifolds 204 to 216, openings 204a to 216a, intake paths 204b to 216b, and flanges 220 to 224 are identical in shape to the corresponding components of Embodiment 1.

The following effects are obtained with the above-described Embodiment 3. (A) By so providing the plate-shaped side wall portions 230 between the manifolds in the direction of manifold arrays 210, 218, the gas introducing passage 234 can be formed in a columnar space 226 between the manifold arrays 210, 218. With such a configuration, the plate-shaped side wall portions 230 are also integrated with the manifolds 204 to 216 so as to seal the gaps between the manifolds 204 to 216 in the manifold arrays 210, 218 and integrated with the plate-shaped bottom wail portion 232 on side where the manifold arrays 210, 21.8 separate. As a result, a strong structural body can be formed in the sub-intake manifold 202.

Furthermore, because plate-shaped bottom wall portion 232 is integrated with wall portions of the manifolds 204 to 216, the two manifold arrays 210, 218 are linearly connected. For this reason, angles θ21, θ22 between the bottom surface of the plate-shaped bottom wall portion 232 and the wall surface of the manifolds 204 to 216 are obtuse angles as shown in FIGS. 17A and 17B, and a structure in which the plate-shaped bottom wall portion 232 is integrated at an acute angle with the wall portions of the manifolds 204 to 216 is not obtained. Therefore, a gap such that causes the stresses generated between the two manifold arrays 210, 218 to concentrate between the plate-shaped bottom wall portion 232 and manifold arrays 210, 218 does not appear. By forming the gas introducing passage 234 in such a manner, it is possible to increase the reinforcing ability for the entire sub-intake manifold 202.

In particular because the plate-shaped side wall portion 230 is integrated in the gaps between the manifolds 204 to 216, the width of the sub-intake manifold 202 can be increased. Therefore, the integration of the manifold arrays 210, 212 can be further enhanced, reinforcing ability for the entire sub-intake manifold 202 can be further improved, and stress concentrations can be further reduced.

Embodiment 4

Figure 19:
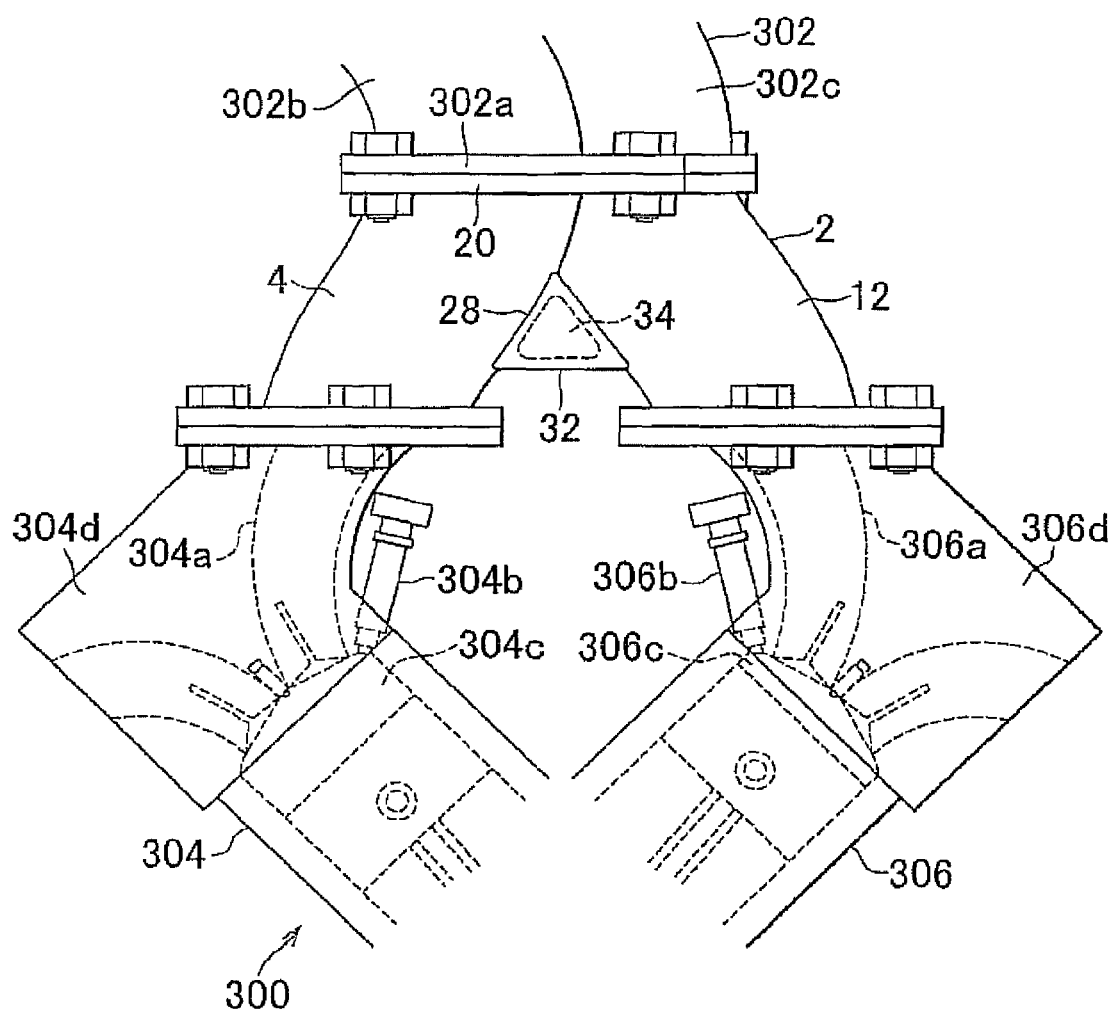
FIG. 19 is an explanatory drawing illustrating a principal configuration of the internal combustion engine of Embodiment 4.

FIG. 19 shows a configuration of Embodiment 4 of the invention. FIG. 19 shows a state in which the sub-intake manifold 2 of Embodiment 1 is incorporated in a V-type six-cylinder internal combustion engine 300. Therefore, the explanation will be conducted with reference to FIGS. 1 to 7. The internal combustion engine 300 is a gasoline engine of an internal fuel injection gasoline engine.

The sub-intake manifold 2 is joined with bolts to a flange 32a on the side of the surge tank 302 in the flange 20 on the intake upstream side. The external air is supplied as intake gas from branch pipes 302b, 302c into manifolds 4 to 16. The intake air is supplied to the intake ports 304a, 306a of each cylinder in each bank 304, 306 of the internal combustion engine 300 via the sub-intake manifold 2.

Because the internal combustion engine 300 is of an in-cylinder fuel injection type, as mentioned hereinabove, fuel injection valves 304b, 306b provided in each cylinder directly inject the fuel into combustion chambers 304c, 306c. The fuel injection valves 304b, 306b are provided in cylinder heads 304d, 306d, and all the fuel injection valves 304b, 306b are disposed between the banks 304, 306 of the internal combustion engine 300. As a result, the fuel injection valves 304b, 306b are disposed below the plate-shaped bottom wall portion 32 of the sub-intake manifold 2.

The following effects are obtained with the above-described Embodiment 4. (A) In addition to the effects described with reference to Embodiment 1, in the internal combustion engine 300, fuel injection valves 304b, 306b are disposed below the intake path gas introducing device 28 having the plate-shaped bottom wall portion 32. As a result, due to the present of the intake path gas introducing device 28, in particular the plate-shaped bottom wall portion 32, the sound shielding effect produced by the banks 304, 306 and sub-intake manifold 2 is enhanced. Accordingly, in addition to the above-described effects of improving the reinforcing ability for the entire intake manifold and reducing stress concentration, sound emitted from the fuel injection valves 304b, 306b can be effectively shielded and a significant noise reduction effect can be produced.

Other Embodiments. (a) In the above-described embodiments, the aggregation state of intake paths 4b to 16b, 104b to 116b, 204b to 216b in flanges 20, 120, 220 on the aggregation side is not a perfect one-row state, but a configuration with a perfect one-row aggregation may be also used.

(b) In the above-described embodiments, examples of sub-intake manifolds 2, 102, 202 are shown, but the configuration of the intake path gas introducing device 28 to 228 of each embodiment can be applied to the intake manifold that is integrally molded by casting or the like with the surge tank and the resultant configuration can demonstrate a similar effect.

(c) In Embodiment 4, the sub-intake manifold 2 of Embodiment 1 is used, but the sub-intake manifold 102 of Embodiment 2 or the sub-intake manifold 202 of Embodiment 3 may be also used. In a case where the sub-intake manifold 102 of Embodiment 2 is used, the plate-shaped bottom wall portion 132 is formed to extend to a large width and the sound shielding effect can be further enhanced. Likewise, in a case where the sub-intake manifold 202 of Embodiment 3 is used, the size of the intake path gas introducing device 228 is large. As result, the plate-shaped bottom wall portion 232 is also formed to have a large width. Therefore, sound shielding effect can be further enhanced.

Figure 20:
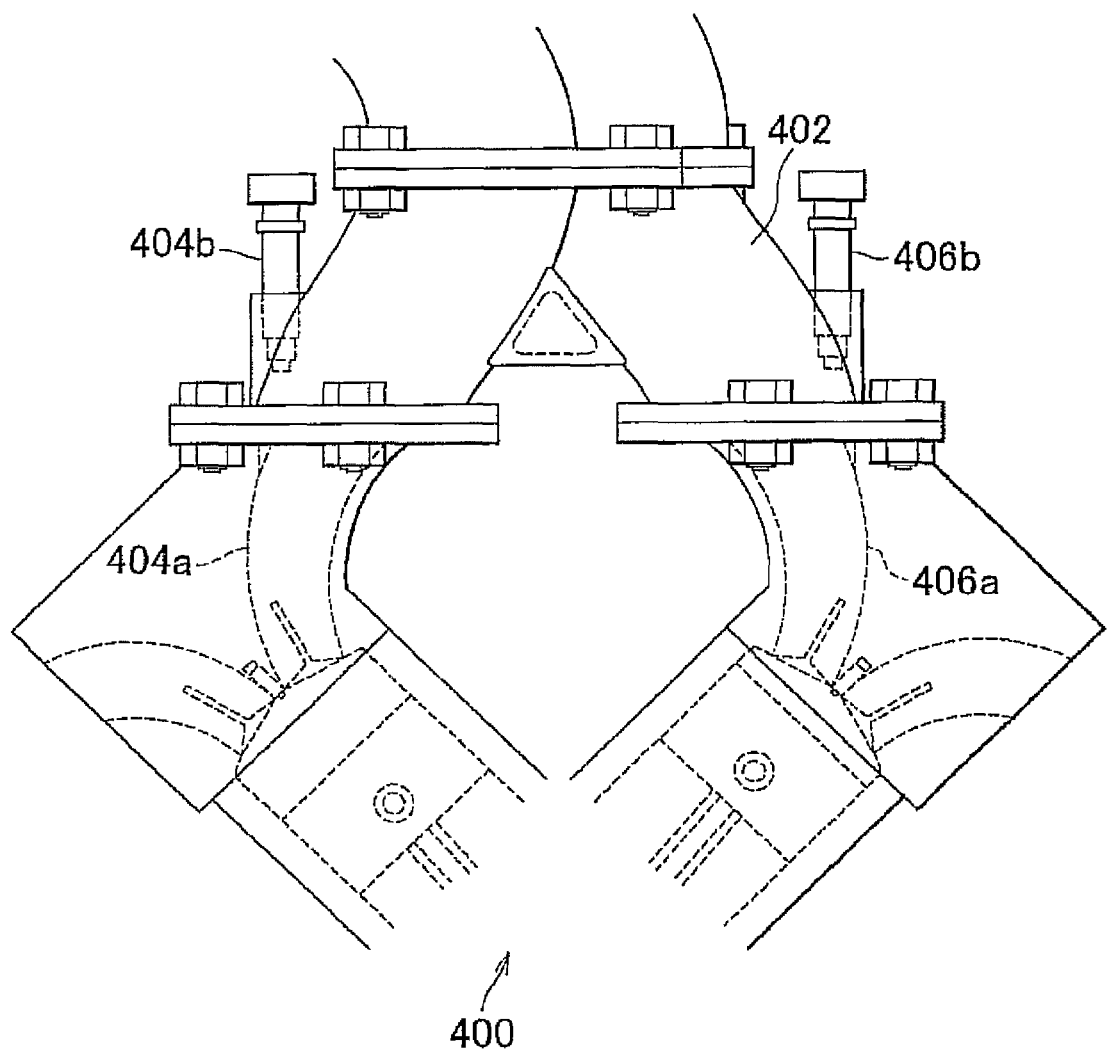
FIG. 20 is an explanatory drawing illustrating a principal configuration of an internal combustion engine of another embodiment.

(d) As shown in FIG. 20, fuel injection valves 404b, 406b that inject fuel into intake ports 404a, 406a of an internal combustion engine 400 may be mounted on a sub-intake manifold 402. The sub-intake manifold 402 has a configuration identical to that of the sub-intake manifold 2 of Embodiment 1, except for the mounting zone of the fuel injection valves 404b, 406b. The configuration other than the mounting zone of the fuel injection valves 404b, 406b may be identical to those of Embodiments 2 and 3.

In a case where the fuel injection valves 404b, 406b that inject fuel into the intake ports is mounted in the configuration of Embodiment 4, an internal fuel injection engine can be obtained in which fuel injection can be performed in the cylinders and in the ports.

(e) In Embodiments 1 and 2, the plate-shaped bottom wall portion 32, 132 is integrally molded with the side wall portion 30, 130 in the form of inverted V. The plate-shaped bottom wall portion 232 of Embodiment 3 is integrally molded with the plate-shaped side wall portion 230 and manifolds 204 to 208, 212 to 216. Alternatively, the configuration of sub-intake manifolds 2, 102, 202, except the plate-shaped bottom wall portions 32, 132, 232 may be molded integrally and the entire configuration may be integrated by joining the plate-shaped bottom wall portions 32, 132, 232 to the integrally molded body.

(1) In Embodiments 1 and 2, the plate-shaped side wall portions constituting the side wall portion 30, 130 in the form of inverted V are connected directly on the aggregation side of the manifold array, but the plate-shaped side wall portions may be also connected indirectly via other members. For example, the plate-shaped side wall portions may be connected indirectly on the aggregation side of the manifold arrays by members such as the top wall portion 220a of Embodiment 3.

(g) In the embodiments, the intake path gas introducing device is used with EGR, but other gases may be also introduced into the intake gas. For example, a blow-by gas or fuel vapor (purge gas from a canister) that is produced by fuel evaporation from the fuel tank may be also introduced into the intake gas. In this case, the effect described in the embodiments can be demonstrated.

(h) In the embodiment, a gasoline engine is described as an internal combustion engine by way of example, but the invention is also applicable to a diesel engine, and a similar effect can be demonstrate in this case.

Figure 21:
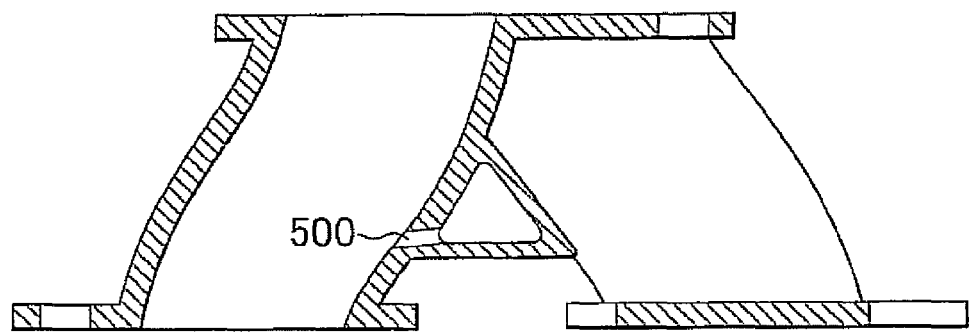
FIG. 21 is a cross-sectional view illustrating openings of another embodiment.

(i) The openings 4a to 16a of Embodiment 1 may have a shape similar to the opening 500 shown in the cross-sectional view in FIG. 21. The same is true for the openings 104a to 116a, 204a to 216a of other Embodiments 2 and 3.

What is claimed is:

1. An intake path gas introducing device wherein the intake path gas introducing device introduces gas from outside an intake path of an intake manifold into the intake path in the intake manifold of an internal combustion engine in which two manifold arrays are aggregated on an upstream side and separated on a downstream side of an intake gas flow to distribute the intake gas to intake ports of two banks, the intake path gas introducing device comprising:
    two plate-shaped side wall portions that are provided integrally between two manifold arrays produced by the separation and along the manifold arrays and connected directly or indirectly at the aggregation side of the manifold arrays, thereby surrounding a columnar space extending between the manifold arrays in an arrangement direction thereof from the aggregation side of the manifold arrays;
    a plate-shaped bottom wall portion that forms a gas introducing passage in the arrangement direction of the manifold arrays between the plate-shaped side wall portions and the plate shape bottom wall portion by sealing a space surrounded by the two plate-shaped side wall portions by integration with the two plate-shaped side wall portions from the separation side of the manifold arrays; and
    openings that link the gas introducing passage to the intake path in each manifold and introduce gas from the gas introducing passage into each intake gas passage.

2. The intake path gas introducing device according to claim 1, wherein side edge portions of the plate-shaped bottom wall portion are formed linearly in the arrangement direction of the manifold arrays.

3. The intake path gas introducing device according to claim 1, wherein side edge portions of the plate-shaped bottom wall portion extend in a direction of withdrawing from the columnar space in gap portions between the manifolds in the manifold arrays.

4. The intake path gas introducing device according to claim 3, wherein the side edge portions of the plate-shaped bottom wall portion extend to the narrowest portion in the gap portions between the manifolds in the manifold arrays.

5. The intake path gas introducing device according to claim 3, wherein the side edge portions of the plate-shaped bottom wall portion extend to the outermost portion in the gap portions between the manifolds in the manifold arrays.

6. The intake path gas introducing device according to claim 1, wherein the plate-shaped bottom wall portion, the plate-shaped side wall portions, and the intake manifold are molded integrally from a metal by casting.

7. The intake path gas introducing device according to claim 1, wherein the plate-shaped side wall portions and the intake manifold are molded integrally from a metal by casting, and the plate-shaped bottom wall portion is integrated with the integrally molded configuration by joining.

8. The intake path gas introducing device according to claim 1, wherein the intake manifold is a sub-intake manifold interposed between a surge tank and intake ports.

9. The intake path gas introducing device according to claim 1, wherein the gas introducing passage introduces exhaust gas of the internal combustion engine into the intake gas.

10. The intake path gas introducing device according to claim 1, wherein the gas introducing passage introduces blow-by gas of the internal combustion engine or fuel vapor produced by fuel evaporation from a fuel tank into the intake gas.

11. An internal combustion engine comprising:
    the intake path gas introducing device according to claim 1 that is assembled with a cylinder head of the internal combustion engine; and
    a fuel injection valve disposed between two banks.

12. An intake path gas introducing device wherein the intake path gas introducing device introduces gas from outside an intake path of an intake manifold into the intake path in the intake manifold of an internal combustion engine in which two manifold arrays are aggregated on an upstream side and separated on a downstream side of an intake gas flow to distribute the intake gas to intake ports of two banks, the intake path gas introducing device comprising:
    a plate-shaped bottom wall portion which covers a columnar space extending between the manifold arrays in an arrangement direction thereof from the separation side of the manifold arrays, and in which edge portions that extend in the arrangement direction of the manifold arrays are integrated with wall portions of the manifolds in the manifold arrays;
    a plate-shaped side wall portion that is disposed along an axial direction of the manifolds between the manifolds of the manifold arrays, integrated with the manifolds, thereby sealing gaps between the manifolds, and integrated with the plate-shaped bottom wall portion on the separation side of the manifold arrays, thereby forming a gas introducing passage on the arrangement direction of the manifold arrays; and
    openings that link the gas introducing passage to the intake path in each manifold and introduce gas from the gas introducing passage into each intake path in wall portions of the manifolds in portions exposed inside the gas introducing passage.

13. The intake path gas introducing device according to claim 12, wherein side edge portions of the plate-shaped bottom wall portion are formed linearly in the arrangement direction of the manifold arrays.

14. The intake path gas introducing device according to claim 12, wherein side edge portions of the plate-shaped bottom wall portion extend in a direction of withdrawing from the columnar space in gap portions between the manifolds in the manifold arrays.

15. The intake path gas introducing device according to claim 14, wherein the side edge portions of the plate-shaped bottom wall portion extend to the narrowest portion in the gap portions between the manifolds in the manifold arrays.

16. The intake path gas introducing device according to claim 14, wherein the side edge portions of the plate-shaped bottom wall portion extend to the outermost portion in the gap portions between the manifolds in the manifold arrays.

17. The intake path gas introducing device according to claim 12, wherein the plate-shaped bottom wall portion, the plate-shaped side wall portions, and the intake manifold are molded integrally from a metal by casting.

18. The intake path gas introducing device according to claim 12, wherein the plate-shaped side wall portions and the intake manifold are molded integrally from a metal by casting, and the plate-shaped bottom wall portion is integrated with the integrally molded configuration by joining.

19. The intake path gas introducing device according to claim 12, wherein the intake manifold is a sub-intake manifold interposed between a surge tank and intake ports.

20. The intake path gas introducing device according to claim 12, wherein the gas introducing passage introduces exhaust gas of the internal combustion engine into the intake gas.

21. The intake path gas introducing device according to claim 12 wherein the gas introducing passage introduces blow by gas of the internal combustion engine or fuel vapor produced by fuel evaporation from a fuel tank into the intake gas.

22. An internal combustion engine comprising:
   the intake path gas introducing device according to claim 12 that is assembled with a cylinder head of the internal combustion engine; and
   a fuel injection valve disposed between two banks.

* * * * *

UNITED STATES PATENT AND TRADEMARK OFFICE
CERTIFICATE OF CORRECTION

PATENT NO. : 8,210,146 B2  
APPLICATION NO. : 12/472876  
DATED : July 3, 2012  
INVENTOR(S) : Nobuhiko Horie et al.

Page 1 of 1

It is certified that error appears in the above-identified patent and that said Letters Patent is hereby corrected as shown below:

In the Specification

At column 1, line number 55, Delete "alternate", Insert -- alternately --

At column 3, line number 19, Delete "late-shaped", Insert -- plate-shaped --

At column 9, line number 26, Delete "21.8", Insert -- 218 --

At column 9, line number 48, Delete ""212", Insert -- 218 --

At column 9, line number 62, Delete "32a", Insert -- 302a --

At column 10, line number 17, Delete "present", Insert -- presence --

At column 11, line number 28, Delete "demonstrate", Insert -- demonstrated --

Signed and Sealed this  
Seventeenth Day of June, 2014

Michelle K. Lee  
*Deputy Director of the United States Patent and Trademark Office*